(12) United States Patent
Nakamura et al.

(10) Patent No.: US 7,945,670 B2
(45) Date of Patent: May 17, 2011

(54) DISTRIBUTED ACCESS CONTROL SYSTEM

(75) Inventors: Taiga Nakamura, Tokyo-to (JP);
Hiroaki Nakamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 2960 days.

(21) Appl. No.: 10/357,038

(22) Filed: Jan. 31, 2003

(65) Prior Publication Data

US 2003/0163522 A1 Aug. 28, 2003

(30) Foreign Application Priority Data

Jan. 31, 2002 (JP) .................................. 2002-023076

(51) Int. Cl.
*G06F 15/173* (2006.01)
(52) U.S. Cl. ........................................................ 709/226
(58) Field of Classification Search .................. 340/5.7; 709/217–219, 226; 707/104.1
See application file for complete search history.

(56) References Cited

U.S. PATENT DOCUMENTS

| | | | | |
|---|---|---|---|---|
| 4,839,640 | A * | 6/1989 | Ozer et al. ................. | 340/5.33 |
| 5,577,209 | A * | 11/1996 | Boyle et al. ................ | 726/4 |
| 5,682,142 | A * | 10/1997 | Loosmore et al. ......... | 340/572.1 |
| 5,805,824 | A * | 9/1998 | Kappe ........................ | 709/242 |
| 5,923,264 | A * | 7/1999 | Lavelle et al. .............. | 340/5.64 |
| 6,233,588 | B1 * | 5/2001 | Marchoili et al. .......... | 707/200 |
| 6,738,772 | B2 * | 5/2004 | Regelski et al. ............ | 707/10 |
| 2002/0046175 | A1 * | 4/2002 | Bleumer .................... | 705/51 |
| 2002/0065919 | A1 * | 5/2002 | Taylor et al. .............. | 709/226 |

FOREIGN PATENT DOCUMENTS

| | | |
|---|---|---|
| JP | 10-078940 | 3/1998 |
| JP | PUPA 2001-243403 | 2/2000 |
| JP | PUPA 2002 015250 | 6/2000 |
| JP | 2001-95484 | 7/2001 |
| JP | PUPA 2001-195484 | 7/2001 |

* cited by examiner

*Primary Examiner* — Benjamin R Bruckart
(74) *Attorney, Agent, or Firm* — Stephen C. Kaufman, Esq.; Ryan, Mason & Lewis, LLP

(57) ABSTRACT

An entrance and exit management system for controlling the entrance and exit at a plurality of management points according to the present invention includes a server connected to a network and managing right information generated from a request for a certain service, a ranking device for generating ranking with respect to the right information and generating sub-right information in response to the ranking, further included is an inquiry information device being responsive to the right information, local servers being connected to the server through the network and placed at the management points, the local server being allowed to make mutual transmissions, and entrance and exit managing means for reading information related to the right information. The means for managing entrance and exit being connected to the local server. Ranking is determined with respect to the relation between the local server and the right information. The server transmits to local servers the sub-right information and the inquiry information having the relation to the ranking of the local servers.

24 Claims, 30 Drawing Sheets

DISTRIBUTED ACCESS CONTROL SYSTEM

BACKGROUND OF THE INVENTION

In recent years, services with which a user may be blessed becomes more and more diversified, and the services may include vehicles such as a train, a bus, an airplane, a theater, a movie theater, an amusement place, and concert hall etc. In addition, an age, the distinction of sex, and a purpose of the person to have the services become diversified and therefore, amounts of users for services have increased such that loads for managing entrance and exit of users of services becomes heavier and heavier. In many cases, the entrance and exit management in the above services so far has been done by examining a ticket when a user pass through a management point, such as, for example, ticket gates for allowing users to have services which are placed at a station, a theater, a movie theater, or a concert hall.

However, the above ticket gate makes a slot against flow of the visitors resulting in inevitable restriction of flow of visitors as well as lowering efficiency of the entrance management. Although a lot of ticket points may be provided by the reason described above, examination of the right information for services by human hands each time for entrance limits the process efficiency and wastes personnel such that the process efficiency for verification of the right information for services upon entrance and exit has impeded improvement in quality and amount of the services.

Conventionally, the rights for services are provided with users by purchasing directly a ticket from a automatic vendor etc., or by reserving and purchasing a ticket through a telephone, a facsimile, Internet, or a reservation window beforehand, and thereafter by receiving the ticket at the receiving window. These procedure is rather simple and familiar to users while requesting for users physical behaviors to receive the ticket, and hence provides inconvenience with the user and the user must elaborately go to the site where the receive window is placed or must stand in line when being crowded. Further to the above, if the user wants to change or cancel the reservation after receiving the ticket, a physical behavior to exchange or to refund the ticket cost must become necessary.

In further recent years, in order to solve the above described inconvenience, an automatic ticket gating machine, which automatically reads magnetically recorded information for services and automatically verifies the exploit right, is widely used. More recently, along with extension of information technology, cash-less technology, and popularization of a portable information terminal, portable storage terminals such as a magnetic card and an IC card which contain right information such as user information, charge information, and reservation information are proposed.

In the entrance and exit management using such portable storage means, users carry only a portable storage means such as the IC card, and a server compares a user information and a right information which comprises the user information and a content of the service for managing entrance and exit for the services to be enjoyed by vehicles or at a theater or a concert hall using a automatic ticket gating machine.

The automatic ticket gate system may enhance managing increased volume and lowering service costs. Various procedures for entrance and exit management and reservation management using the portable storage means such as above described IC card has been proposed so far, and for example, in Japanese Patent Publication (Laid-open) No. 2001-195484, a verification system of a user ID without the work for reservation verification by human hands, in which a ticket less process for issuing a ticket or entrance is provided using a portable information terminal, a on-site terminal, and a reservation management server.

With referring to FIG. 28, an above described conventional verification system for a user identification information (hereafter referred to user ID) using a master server is described. As depicted in FIG. 28, in Japanese Patent Publication (Laid-open) No. 2002-195484, the master server 200 controls the automatic ticket gating machine 202 to read the information recorded, for example, in a portable storage means of visitors accessing to the automatic ticket gating machine and to transmit to the master server 200 the read information. The master server 200 determines the exploit right from the registered reservation information and transmits verify information to the specified automatic ticket machine 202 to activate gates or alarms. In the conventional system shown in FIG. 28, all of the exploit rights for services is determined by the master server. Then high access frequency lowers a system processing rate due to the increase of the load of the server for managing reservations as well as causing overflow thereof, which may lead to the drawback that the processing efficiency of the automatic ticket gating machine 202 is lowered.

In order to overcome the drawback of the verification system shown in FIG. 28, the system comprising servers, for each managing the associated automatic ticket gating machines, other than the master server 200 (hereinafter referred to local servers), may be provided; the local servers receive the electric ticket information stored on the master server 200 as dead copies of the electric ticket information may reduce the above described drawback. With referring to FIG. 29, the automatic ticket gate system, which comprises the server 200, local servers 204, and the automatic ticket gating machines 202, is depicted.

As shown in FIG. 29, the user information read from the automatic ticket gating machine is stored tentatively in the local server 204. The local server 204 stores the right information comprising the user information and the service contents which had been sent from the master server 200 beforehand. The user information and the right information are compared to activate the gates or alarms of the automatic ticket gating machine. In the automatic ticket gate system shown in FIG. 29, inquiries from the automatic ticket gating machine 202 are processed in each of the local server 204 such that the load overhead caused by concentration of the inquiries to the master server 200 may be avoided.

However, illegal accesses, for example, multiple access with the identical right can not be prevented if the event that the exploit right for the service has been used, that is, the reserved service has been enjoyed is not acknowledged to the other local server 204 after the verification of the right information for services. FIG. 30 shows the process of the local server 204 in the automatic ticket gate system depicted in FIG. 29. As shown in FIG. 30, the master server 200 frequently transmits with the local server 204 when the user passes through the automatic ticket gating machine using his or her reserved rights or each time the user cancels or changes the reservation by accessing the master server 200. In the case that a lot of local servers are placed, it is necessary to reflect such changes and updates of the right information promptly to the local servers.

The overhead on the above local server 204 causes another drawback which lowers the entire system efficiency due to the overhead to the local server 204, because mutual information management must be required between the master server 200 and the local servers 204 such that transmission traffics are increased though the local servers 204 have been introduced other than the master server 200.

Japanese Patent Publication (Laid-open) Heisei No. 10-78940, for example, a master node is provided with ability for request to obtain a ticket in a multi-node information processing system constructed as a multi-processor system by determining the master node with a ticket generator constructed as a hardware, and by storing an address of the ticket generator at each node in order to distribute quickly a ticket as used to an identifier or a ravel uniquely identifying tasks or events. The ticket used in Japanese Patent Publication (Laid-open) Heisei No. 10-78940 likely means numerals used as identifier (ID). Therefore, the increase of overhead of transmission traffic associated with cancel or change and/or update of tickets are not objectives to be solved, and hence there are still needs to provide the system which automatically verifies and processes the exploit rights of users for services with high reliability and high efficiency.

As described above, the following requirements must be fulfilled to provide a automatic ticket gating system with high reliability, automatic verification ability together with high efficiency:
(1) to be able to manage the cases in which a lot of managing sites are provided and access frequencies of users are high;
(2) to be able to manage effectively the usage, change, and cancel of the rights with respect to the right information,
(3) to complete entrance and exit process by comparing the user information and the right information belonging to the user. However, the conventional processes or systems have not been sufficient.

SUMMARY OF THE INVENTION

A feature of the present invention is an entrance and exit management system for controlling entrance and exit at a plurality of management points, the entrance and exit management system is provided. The system comprises:
  a server connected to a network and managing right information generated from a request for a certain service;
  a ranking means for generating ranking with respect to the right information and generating sub-right information in response to the ranking;
  an inquiry information means in response to the right information;
  local servers being connected to the server through the network and placed at the management points, the local server being allowed to make mutual transmissions;
  an entrance and exit managing means for reading information related to the right information, the means for managing entrance and exit being connected to the local server;
  wherein the ranking is determined with respect to the relation between the local server and the right information and wherein the server transmits to local servers the sub-right information and the inquiry information having the relation to the ranking of the local servers.

According to another feature of the present invention, a method for controlling a server included in an entrance and exit management system, the system managing entrance and exit at a plurality of management points is provided. The method comprising the steps of:
  managing right information generated from a request for a certain service a server connected to a network;
  generating ranking with respect to the right information;
  generating sub-right information with respect to the ranking;
  generating inquiry address information for lacked information with respect to the ranking;
  transmitting the sub-right information and the inquiry address information through the network.

According to yet another feature of the present invention, a method for controlling a local server included in an entrance and exit management system, the system managing entrance and exit at a plurality of management points may be provided. The method comprises the steps of:
  managing in a ranked local server sub-right information generated from right information in response to the ranking;
  receiving by the local server a signal read from a entrance and exit managing means;
  searching the sub-right information stored in the local server in response to the signal read from the entrance and exit managing means;
  determining whether or not the sub-right information stored in the local server includes inquiry addressee information;
  transmitting an entrance permission signal to the entrance and exit managing means after comparing the sub-right information and the read information when the sub-right information does not include the inquiry address information; and
  issuing an inquiry toward the addressee when the sub-right information includes the inquiry address information.

According to still another feature of the present invention, a computer readable medium storing a program for controlling a server included in an entrance and exit management system, the system managing entrance and exit at a plurality of management points is provided. The program having the server execute the steps of:
  managing right information generated from a request for a certain service a server connected to a network;
  generating ranking with respect to the right information;
  generating sub-right information with respect to the ranking;
  generating inquiry address information for lacked information with respect to the ranking;
  transmitting the sub-right information and the inquiry address information through the network.

According to another feature of the present invention, a computer program for controlling a local server included in an entrance and exit management system and connected to an entrance and exit managing means, the system managing entrance and exit at a plurality of management points is provided. The program having the local server execute the steps of:
  managing in a ranked local server sub-right information generated from right information in response to the ranking;
  receiving by the local server a signal read from a entrance and exit managing means;
  searching the sub-right information stored in the local server in response to the signal read from the entrance and exit managing means;
  determining whether or not the sub-right information stored in the local server includes inquiry addressee information;
  transmitting an entrance permission signal to the entrance and exit managing means after comparing the sub-right information and the read information when the sub-right information does not include the inquiry address information; and
  issuing an inquiry toward the addressee when the sub-right information includes the inquiry address information;
  wherein the local server stores sub-right information with different contents depending on the ranking, and wherein the addressee generates an entrance permission signal and transmits to the local server originated the inquiry and the addressee is a local server other than the local server received the signal from the entrance and exit management means.

Another feature of the present invention includes, a computer readable storage medium storing a program for controlling a local server included in an entrance and exit management system and connected to an entrance and exit managing means. The system manages the entrance and exit at a plurality of management points. The program causes the local server to execute the steps of:

managing in a ranked local server sub-right information generated from right information in response to the ranking;

receiving by the local server a signal read from a entrance and exit managing means;

searching the sub-right information stored in the local server in response to the signal read from the entrance and exit managing means;

determining whether or not the sub-right information stored in the local server includes inquiry addressee information;

transmitting an entrance permission signal to the entrance and exit managing means after comparing the sub-right information and the read information when the sub-right information does not include the inquiry address information; and issuing an inquiry toward the addressee when the sub-right information includes the inquiry address information;

wherein the local server stores sub-right information with different contents depending on the ranking, and wherein the addressee generates an entrance permission signal and transmits to the local server originated the inquiry and the addressee is a local server other than the local server received the signal from the entrance and exit management means.

Various other objects, features, and attendant advantages of the present invention will become more fully appreciated as the same becomes better understood when considered in conjunction with the accompanying drawings, in which like reference characters designate the same or similar parts throughout the several views.

DETAILED DESCRIPTION OF THE INVENTION

Figure 1:
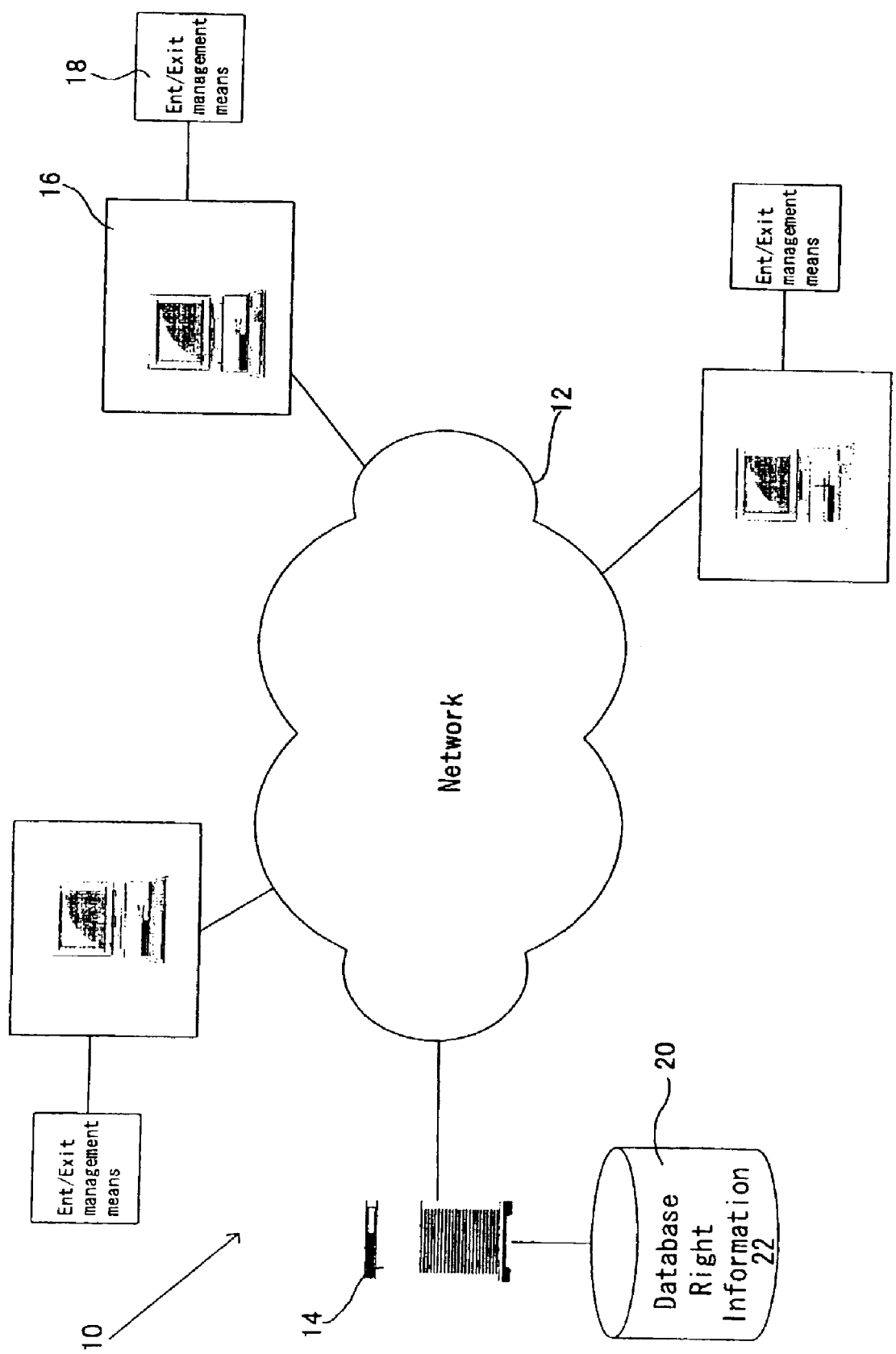
FIG. 1 Illustrates schematic diagram of the entrance and exit management system according to the present invention.

The present invention relates to management of user's right information for services, such as, for example, a vehicle, a theater, an amusement park, or a concert hall, which contain date and location information associated with date, and more particularly, relates to an entrance and exit management system, a method for managing entrance and exit, a program product for execution of the method for entrance and exit, and a computer readable medium containing the program for executing the method for entrance and exit management such that a registration of reservation, a cancel of the reservation, and a status for the service responsible to the reservation may be processed.

The present invention has been made to solve the above drawbacks, and an object of the present invention is to provide an entrance and exit system which uses the user information stored in a portable storage means and the right information stored in a master server; the entrance and exit system according to the present invention make it possible to determine the right information of the same user at a multiple management points where a plurality of entrance and exit means such as automatic ticket gating machines are placed, to avoid concentration of overheads to the master server and the local servers while making it possible to process usage of the right, change or cancel of reservations and to complete the entrance and exit management through the automatic ticket gating machines.

To solve the above problem, the present invention partly made by the recognition that, in an entrance and exit management system utilizing a user information stored in a portable storage means such as an IC card and right information stored in a master server, the overheads to the local servers may be improved by reducing amounts of information processing between the master server and the local servers together with amounts of information processing between the local servers by generating a plurality of kinds for sub-right information with respect to nature of services to be enjoyed by the right information, and by storing the sub-right information in the local servers.

The entrance and exit management system comprises a master server storing the right information generated from requests of uses, local servers placed at management points where the practical entrance and exit management is executed, and at least one entrance and exit management means controlled by the local server. The local servers store and manage the sub-right information received from the master server, which is generated from the right information managed by the master server. The entrance and exit management is executed by local server using the information generated based on the right information managed by the master server. The local servers receive updated right information which the master server has send to the local server when the right information is updated.

In turn, a ranking is provided with the local server depending on certain characteristics of services, and the local server inquires other local server with respect to the ranking thereof to execute the entrance and exit management. In the present invention, contents of right information distributed to the local servers make to be differed each other depending on the characteristics of services, and the local server originated the inquiry issues an entrance permission signal by an instruction from the local server storing the information for providing the entrance permission. Therefore, the concentration of the overhead to the master server may be avoided as in the case that a plurality of the entrance and exit management means are connected to only one master server. In addition, the present invention make it possible to avoid lowering the performance of the entrance and exit management system without causing the above described drawbacks by simply placing the local servers between the master server and the entrance and exit management means.

The system according to the present invention, a local server having higher ranking manages the sub-right information including much amounts of information than local servers having lower ranking. The system according to the present invention, a local server having lower ranking manages entrance and exit by inquiring to the higher rank local server with the inquiry information. The system according to the present invention, either a local server having executed the entrance and exit management or a local server being received with the inquiry information issues to the server update information for usage information. According to the present invention, the right information is reservation information for a passenger train or an event.

The method for controlling a server according to the present invention, further may comprise the steps of:
  receiving usage information of the service; and
  updating the right information in response to usage of the service. In the method for controlling a server according to the present invention, the generating sub-right information with respect to the ranking may comprise changing contents of the sub-right information in response to high and low of the ranking. In the method for controlling a server according to the present invention, the right information includes reservation information for a passenger train or an event. In the method for controlling a server according to the present invention, wherein the request comprises reservation for a passenger train or an event.

According to the method for controlling a local server according to the present invention, the local server stores sub-right information with different contents depending on the ranking. In the method for controlling a local server according to the present invention, the addressee generates an entrance permission signal and transmits to the local server originated the inquiry. In the method for controlling a local server according to the present invention, the addressee may be selected from local servers other than the local server received the signal from the entrance and exit managing means. In the method for controlling a local server according to the present invention, the right information may be electric ticket information comprising reservation information for a passenger train or an event.

The computer readable medium according to the present invention may further comprise the steps of: receiving usage information of the service; and updating the right information in response to usage of the service. In the present invention, the right information may be electric ticket information comprising reservation information for a passenger train or an event.

Herein below, the present invention will be described in detail, however, the present invention is not limited to embodiments described below.

FIG. 1 shows the entrance and exit management system 10 according to the present invention. The entrance and exit management system 10 comprises the master server 14 connected to the network 12, local servers 16 connected to the master server 14 through the network 12. To the local server 16, the entrance and exit management means 18 such as the automatic ticket gating machine is connected, and the local server 16 and the entrance and exit management means 18 are placed at each of the management places. The entrance and exit managing means 18 reads user information recorded in the portable storage means such as an IC card, and transmits the read information to the local server 16.

The database 20 is included in the master server 14 and stores and manages the right information 22 generated depending on requests of users. The master server 14 also processes the generated right information 22 to create the right information with restricted contents according to the present invention and is allowed to send the created sub-right information to the local servers 16. Further to the above, the master server 14 may receive requests from user such as reservation for enjoying services by a cellar phone, a telephone, or a personal computer, where communicated through a wireless network, a public telephone line, ISDN, a light communication.

The network 12 may include networks using well known transmission protocols such as TCP/IP, particularly, may include an analog public telephone line, a digital transmission line connected by the lines such as ISDN, or a wireless network by a ground wave or a satellite telecommunication or a light communication. These telecommunication network may be used to in any combination of a plurality of the network resources necessary for providing required free or charged services.

The master server 14 and/or the local servers 16 may be selected among any workstation or personal computer well known so far as their storage capacity and processing speed are acceptable, and may be a workstation such as RS-6000 (Trade Mark), implemented with a central processing unit (CPU) such as POWER PC (Trade Mark) while running an operating system (OS), for example, AIX windows or a personal computer implemented with a central processing unit (CPU) such as PENTIUM (Trade Mark), POWER PC (Trade Mark), while running WINDOWS (Trade Mark), WINDOW NT (Trade Mark), OS/2 (Trade Mark), or Mac OS (Trade Mark).

When the master server 14 receives request for reservation from users, the entrance and exit management system shown in FIG. 1 processes the requests including kinds of the services with respect to the reservation, a date, a sheet assignment, a boarding section, change, or cancel of the reservations to generate and to store the right information in the database 20 or in a adequate storage region in the master server 14. In the present invention, the local servers are provided with a ranking and the sub-right information is created depending on the ranking upon distributing the right information 22 stored in the master server 14. At the same time, the master server 14 creates inquiry information being sent to local server having necessary information for causing the local server to issue the entrance permission and transmits the inquiry information to the local server together with the sub-right information. Alternatively, it may be possible to send only necessary sub-right information requested from the start of working to the predetermined local server 16 in the time section that the access can not be assumed such as night.

In addition, when change in the right information due to the change or cancel of reservations, the master server 14 receives the change or cancel of the right information and modifies the right information. At the same time, the master server 14 creates a new sub-right information from the modified right information to transmit the new sub-right information to the local server 16 which is necessary to handle the right information. In the entrance and exit management system, in the case of the change or cancel of the right information, the master server 14 makes transmissions to the local server 16 independently from the entrance and exit processing when the transmission is required such that the overhead to the master server 14 may be significantly reduced while minimizing drawbacks on the entrance and exit management.

Figure 2:
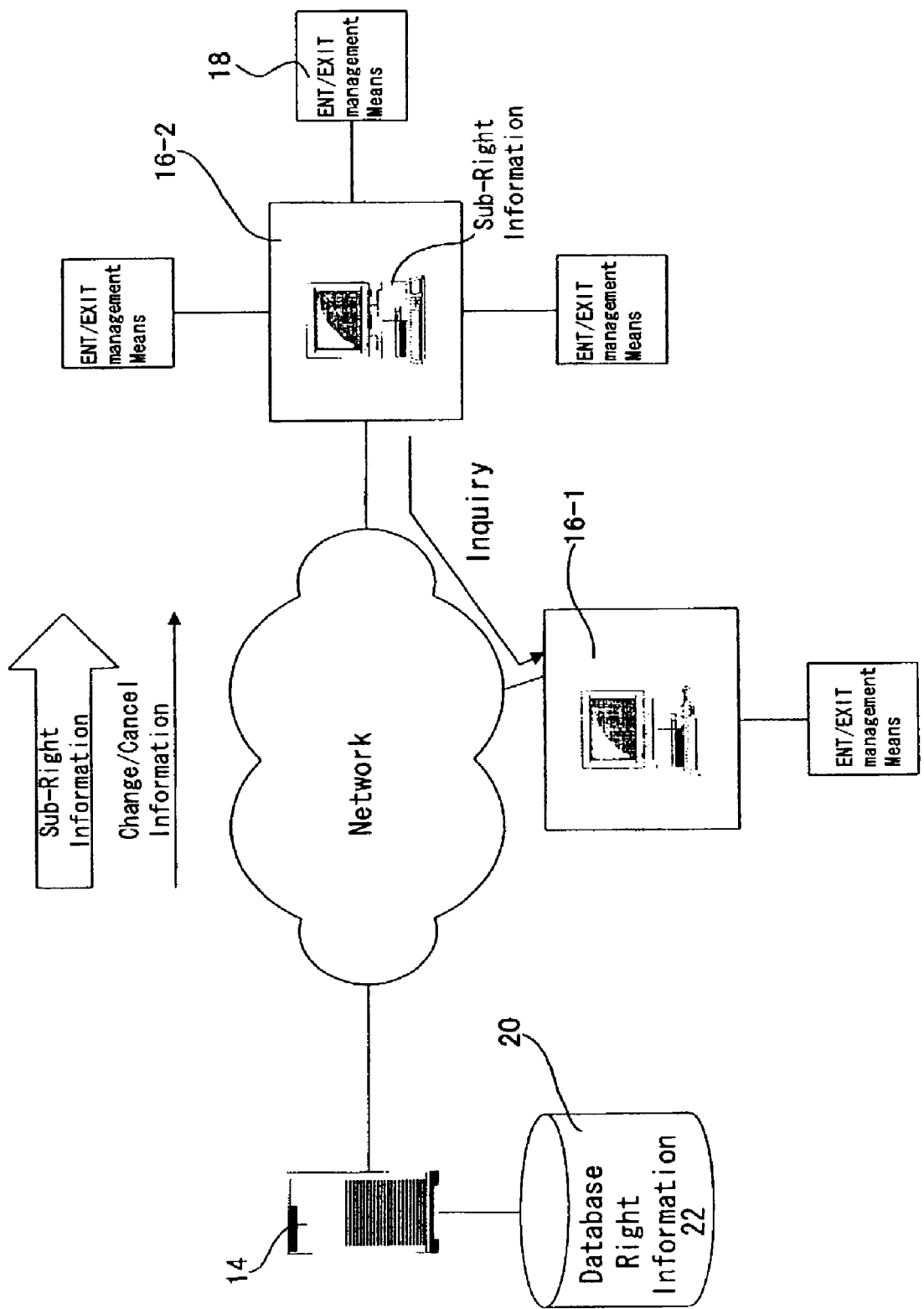
FIG. 2 Shows schematic functions of a master server and local servers according to the present invention.

FIG. 2 shows a schematic function of the master server 14 and the local server 14 in the entrance and exit management system 10 according to the present invention. As shown in FIG. 2, the entrance and exit management system 10 distributes stored the right information 22 such as the received reservation from users to the local servers 16-1, 16-2 during the time range such as night where the overheads to the master server 14 and the local server 16 are assumed to be low. The master server 14 receives the request for change or cancel of the reservation from users and processes them. The master server 14 generates modified sub-right information using only the right information 22 changed or canceled, and sends them to only one or a plurality of the local servers 16 which have possibility to process the information in relation to the corresponding right information using, for example, a user ID or an electric ticket ID.

Here, the functions of the local server 16-1, 16-2 further will be explained herein below. The local server 16-2, for example, receives the information read by the entrance and exit management means 18-2 from the portable storage means such as the IC card carried by the user, and compares the read information to the stored sub-right information for verifying the user. When the local server 16-2 finds the inquiry address information, the local server 16-2 transmits user ID etc. to the addressed local server. The local server 16-1 receives the inquiry and judges entrance permission using the received user ID, effective term information, and the boarding section information to issue the entrance permission signal. The entrance permission signal is sent to the local server 16-2 issued the inquiry, and causes to activate the entrance and exit means 18-2 so as to acknowledge an access right of the user own by opening gates or starting the alarm.

The local server 16-1 sends the entrance record as a entrance flag to the local server 16-2 placed at an destination station to acknowledge the initiation of the usage of the right with respect to the service. At the same time, the local server 16-1 issues update information that the entrance flag has set in the master server 14 to cause to update the right information 22 stored in the master server 14.

In the portable storage means such as IC card carried by the user according to the present invention, any user information such as, for example, user identification information, usage history, name, address, charge address etc. may be stored; however, the portable storage means may contain only the user identification information (hereafter referred to user ID) by way of precaution against an unexpected event such as burglary or lost. The above described entrance and exit management means 18 is constructed to verify the user with respect to the particular service by searching the sub-right information stored and managed in and at the local server with referring to the user ID obtained from the portable storage means.

Figure 3:
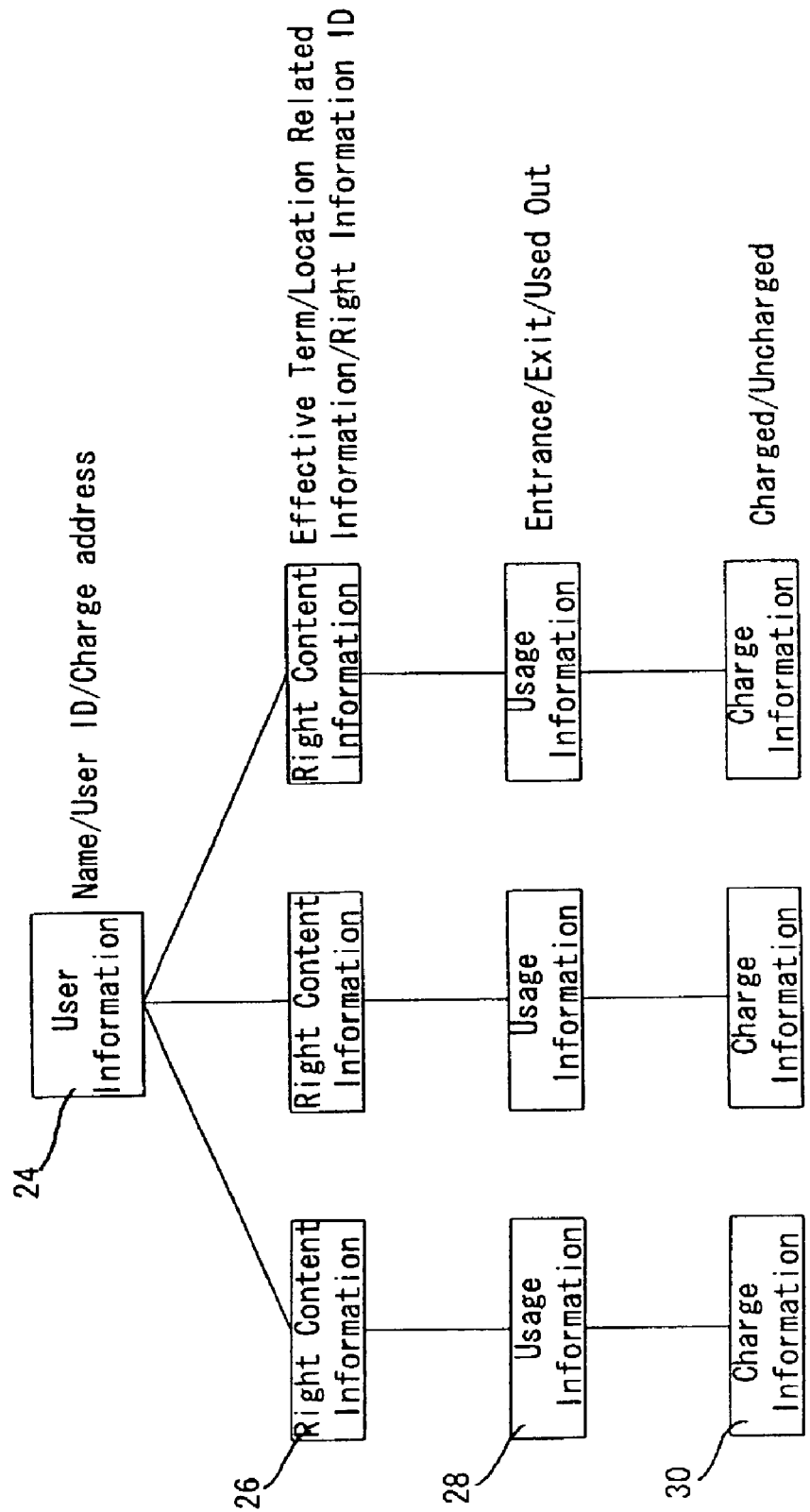
FIG. 3 Shows schematic construction of right information possibly used in the present invention.

FIG. 3 shows a schematic construction of the right information 22 being used in the present invention. As shown in FIG. 3, the right information 22 comprises the user information 24, the right content information 26 for the services that the user expected to be provided. The right content information may contain the effective term information such as date or duration, the sheet assignment, a boarding station, a destination station, and a boarding section. The right information may further contain the usage information 28 which manages usage situation for the services with respect to the reservation such as entrance/exit/used-out.

In the electric ticket information shown in FIG. 3, the user information 24 may contain information relating to privacy of the user recorded beforehand such as, for example, name, user ID, charge address. In turn, the right content information 26 may be constructed to contain an effective term information of the service such as date and term, the location information such as a sheet assignment, the boarding station, the destination station, the boarding section as well as right information identification information (herein below referred to right information ID) for coping with the case that the same user possesses a plurality of kinds of overlapping of the right information.

Now, the present invention is detailed by providing explanation on the right information 26. For example, in the case that the system according to the present invention is assumed to be the system for processing a reservation/entrance and exit for a passenger train. The right information 22 may be constructed to include the effective term information and the location relating information as Table I provided below:

TABLE 1

| Right information ID | User information | Effective term information | Location related information | Usage information |
|---|---|---|---|---|
| ******* | User ID/charge address | xxxx-oooo | Train type/train No.*** | Before use/enter/used-out |

Further in the present invention, as shown in FIG. 3 and Table I, the charge information 30 may be included in the right content information 26 to check charge situations and to identify a user to which the charging can not be permitted. The usage information shown in FIG. 3, may also be constructed, for example, to include the flag for indicating before use/enter/used so as to manage the entrance and exit together with the used-out.

The above described effective term information may be used to verify effectiveness of the right information, and in an particular embodiment of the present invention, to delete the right information 22 having passed the effective term thereof. In an alternative embodiment in which the automatic delete of the right information by the effective term is not necessary, the effective term information may not be included in the right information.

In addition, the master server 14 of the present invention, is constructed to provide the ranking with the local servers depending on kinds of the services and to generate the sub-right information depending on the ranking so as to distribute thereof to a responsible local server. For example, when assuming the reservation of a boarding ticket of the passenger train, the information such as the user ID/effective term information/boarding station ID/destination station ID/usage information may be selected for generation of the sub-right information for the boarding station and the destination station. Similarly, further restricted sub-right information may be generated for the stations at which the user is allowed halfway exit using the user ID/effective term information/inquiry address etc. In addition, when the right information 22 does not allow the user to enter or to exit, the master server 14 does not generate any sub-right information and does not distribute any information to the corresponding local servers.

The present invention uses the above described entrance and exit system for controlling the entrance and exit managing means such as the automatic ticket gating machine based on the information recorded in the IC card carried by users. Herein below, further particular embodiment of the preset invention is described using the system for managing the reservation and the entrance and exit at the automatic ticket gating machine of stations.

Figure 4:
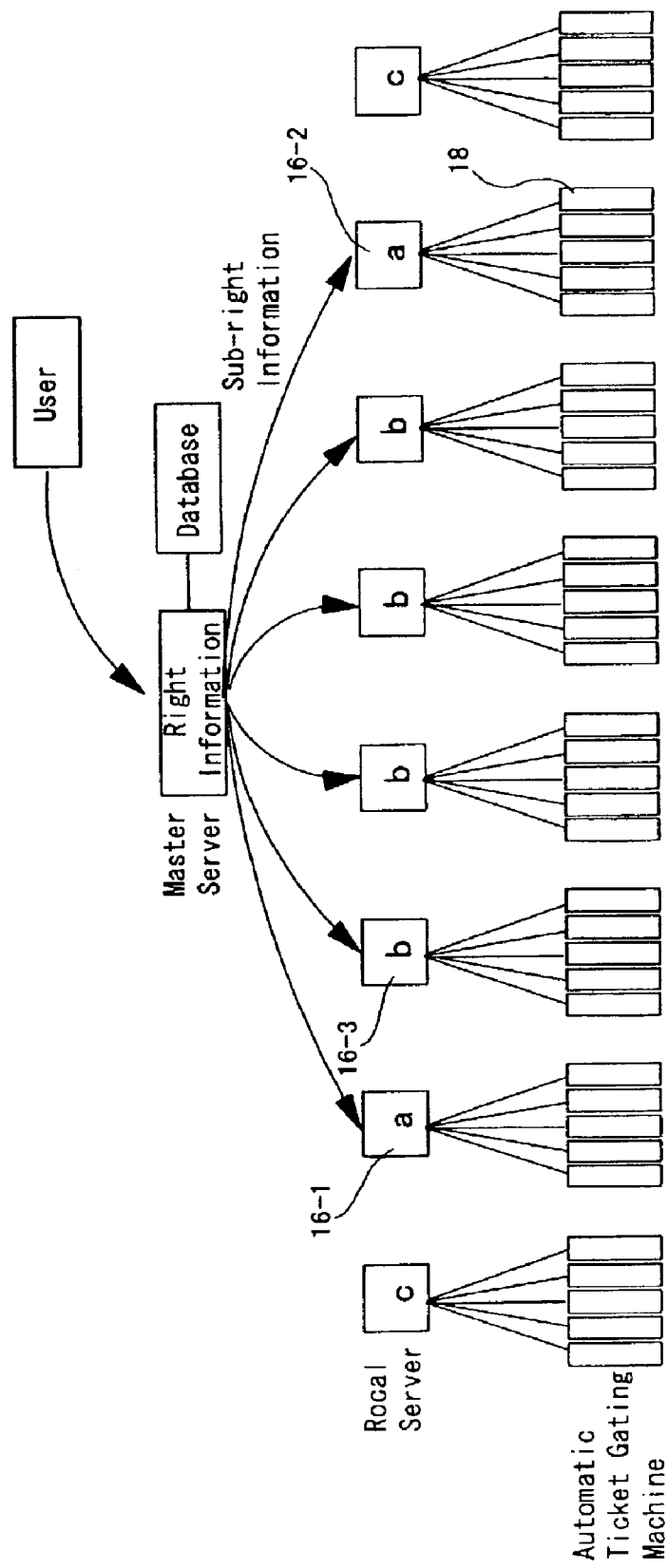
FIG. 4 Shows schematic construction of the entrance and exit management system according to the present invention.

FIG. 4 shows a schematic block diagram of the entrance and exit management system according to the present invention. In the entrance and exit management system 10, users access to the master server 14 make reservation and the master server 14 generates the right information 22 and stores the right information 22 as the whole formats. The master server 14 distributes different sub-right information constructed from the right information 22 to the local server 16-1, 16-2, and 16-3. The local servers shown in FIG. 4 are provided with the ranking represented by the letters "a", "b", and "c", and the ranking will be described later. As shown in FIG. 4, when the user makes reservation to the service, the right information corresponding to the user ID is generated in the master server 14, and is stored in the database 20 together with the right information ID.

With referring to FIG. 4, in the present invention, after generation and registration of the right information created by the request from the user, the master server 14 generates a plurality of kinds of the sub-right information constructed by selecting certain information in the right information depending on the ranking of the local servers, and distributes them to the corresponding local server 16. As described above, the distribution of the sub-right information is carried out by distributing the ranked sub-right information generated using the information stored in the master server with respect to the characteristics of the services rather than distributing the dead copies of the database 20 to the local server 16.

The above rankings are represented as the rankings (a-c) of the local servers 16 in FIG. 4. In the particular embodiment of the present invention, for example, the rank "a" is provided with the stations at which the user gets on or gets off the train such as a departure station and a destination station. Alternatively, the rank "b" is provided with stations at which the user to enter or exit between the departure station and the destination station while the rank "c" is provided with stations at which the user is nor allowed to get on or get off with the electric ticket. The detail of the ranking will be explained later.

Again referring to FIG. 4, the entrance and exit management system according to the present invention will be explained. At least one entrance and exit management means 18-1 is each connected to the local server 16-1. The entrance and exit management means 18-1 may be, in a particular embodiment of the present invention, an automatic ticket gating machine placed at a gating section of the station. The entrance and exit management means 18-1 reads out through an adequate magnetic or electronic interfaces the user ID recorded magnetically or electronically in the portable storage means carried by the user and sends it, for example, to the local server 16-1.

The local server 16-1 receives the user ID and searches the sub-right information distributed beforehand from the master server 14 using the user ID. For example, when the sub-right information corresponding to the user ID is found in the local server 16-1, the effective term information and the location related information are examined. After verification of all of the information, the local server 16-1 issues to the entrance and exit management means 18-1 an entrance permission signal. The entrance and exit management means 18-1 received the entrance permission signal, for example, activates the gate to open so that the user may be allowed to enter there through.

Figure 5:
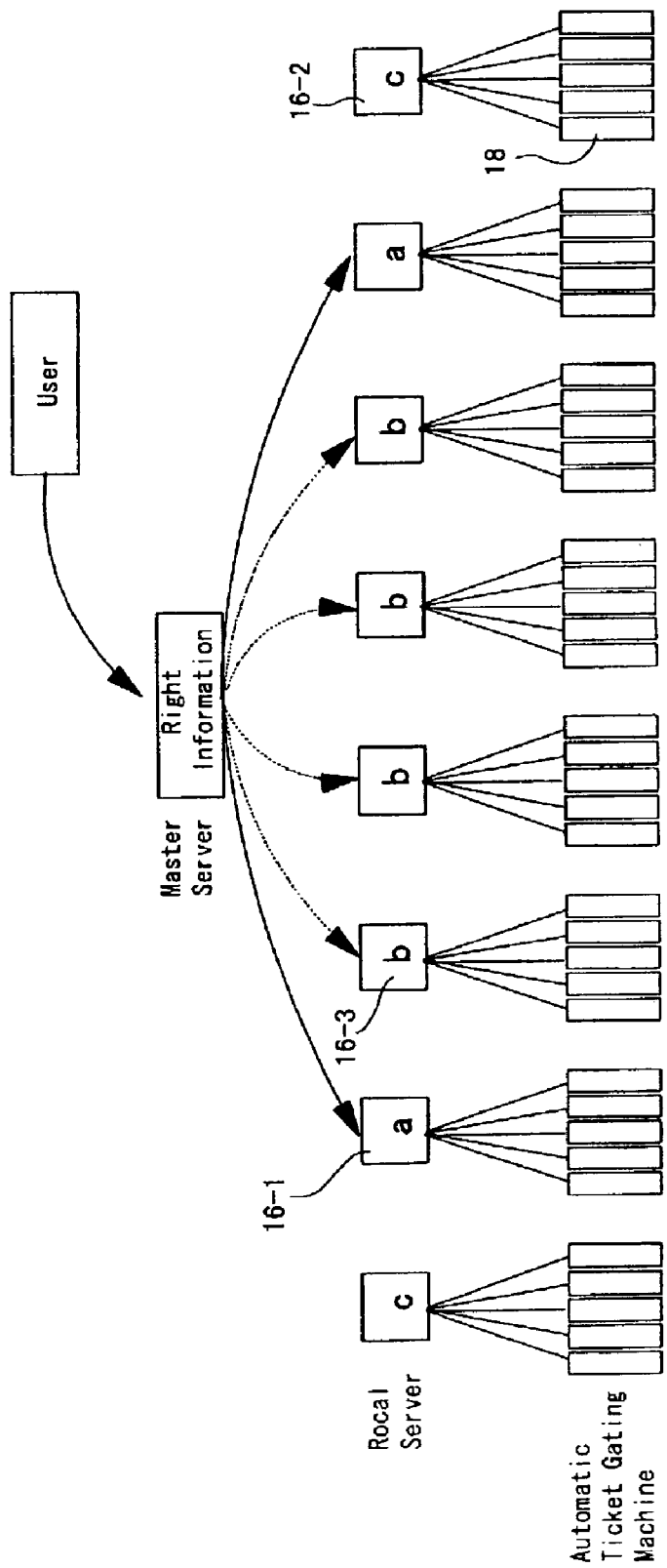
FIG. 5 An embodiment of the process executed in the entrance and exit management system according to the present invention when a user change or cancel a reservation.

FIG. 5 shows an embodiment for the process in the entrance and exit management system according to the present invention when the user cancels or changes the reservation. A cancel operation may be applied to not only the cancel itself but to the change of the reservation using the cancel process because the change operation proceeds by canceling the reservation before the change and by making a new reservation. Here, when the user cancels the right information 22, the right information 22 is set to an inhibit status after confirmation of not being used out by checking the flag information in the master server 14 with referring to the user ID or the right information ID or after confirmation of the right information being within the effective term when the reservation information includes the effective term information.

Now, the previous information before the cancel or change may be deleted from the master server 14 or may be stored in the master server 14, for example, by moving the previous right information to another storage section. Alternatively, the previous right information may be provided with a delete flag so as not to be referred in a normal procedure.

When the master server 14 accepts the request for the cancel or change from the user as shown in FIG. 5, the master server 14 sets the right information 22 to the inhibit status, and then instructs to the local server 16-1 to delete the corresponding sub-right information. In this embodiment, the master server 14 acknowledges, to local servers having the possibilities of halfway entrance or exit, that the reservation has canceled or changed so that the information corresponding to the user ID or the right information ID may be deleted. In addition, according to the present invention, since the entrance permission is not issued by the halfway stations, the halfway stations may store the sub-right information remained as is till the sub-right information is by automatically deleted using the effective term information.

Figure 6:
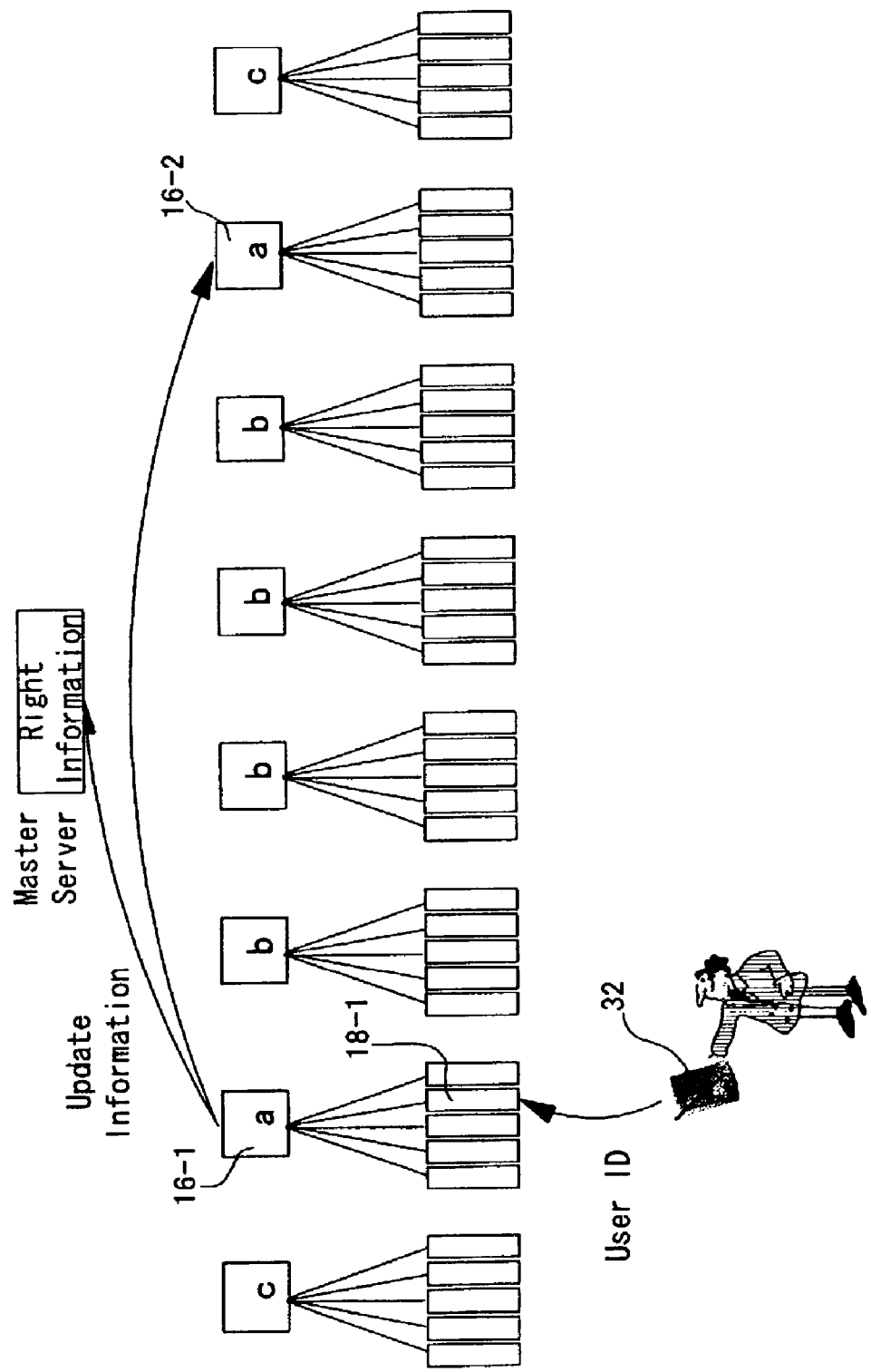
FIG. 6 shows an detailed process of the local server when a user passes through an entrance and exit management means.

FIG. 6 shows a detail of a local server process when the user tries to enter through the entrance and exit management means. In the embodiment described in FIG. 6, the case that the user tries to enter through the local server 16-1 is described. As shown in FIG. 6, when the user tries to pass through the entrance and exit management means 18-1 connected through the local server 16-1, the entrance and exit management means 18-1 reads out from the portable storage means 32 the user ID recorded therein. The entrance and exit management means 18-1 inquires the read right information corresponding to the user ID to the local server 16-1 to which the entrance and exit management means 18-1 is connected.

The local server 16-1 searches the stored user ID corresponding to the received user ID by referring to the received user ID to examine presence of the corresponding sub-right information. Next, the location related information and the effective term information included in the sub-right information are referred to examine that the station may allow the entrance and may be in the effective term. Further next, it is examined whether or not the used out flag has been set with referring to the usage information. When the used out flag is not set, the entrance and exit management means 18-1 receives the entrance permission signal to allow the user to pass through the gate of the entrance and management means 18-1. At the same time the local server 16-1 sets an entered flag to the usage information included in the corresponding sub-right information. The local server 16-1 further sends the usage information to the master server 14 and the other local server 16-2 to set the entered flag for updating the usage information while specifying the user ID or the right information ID.

Figure 7:
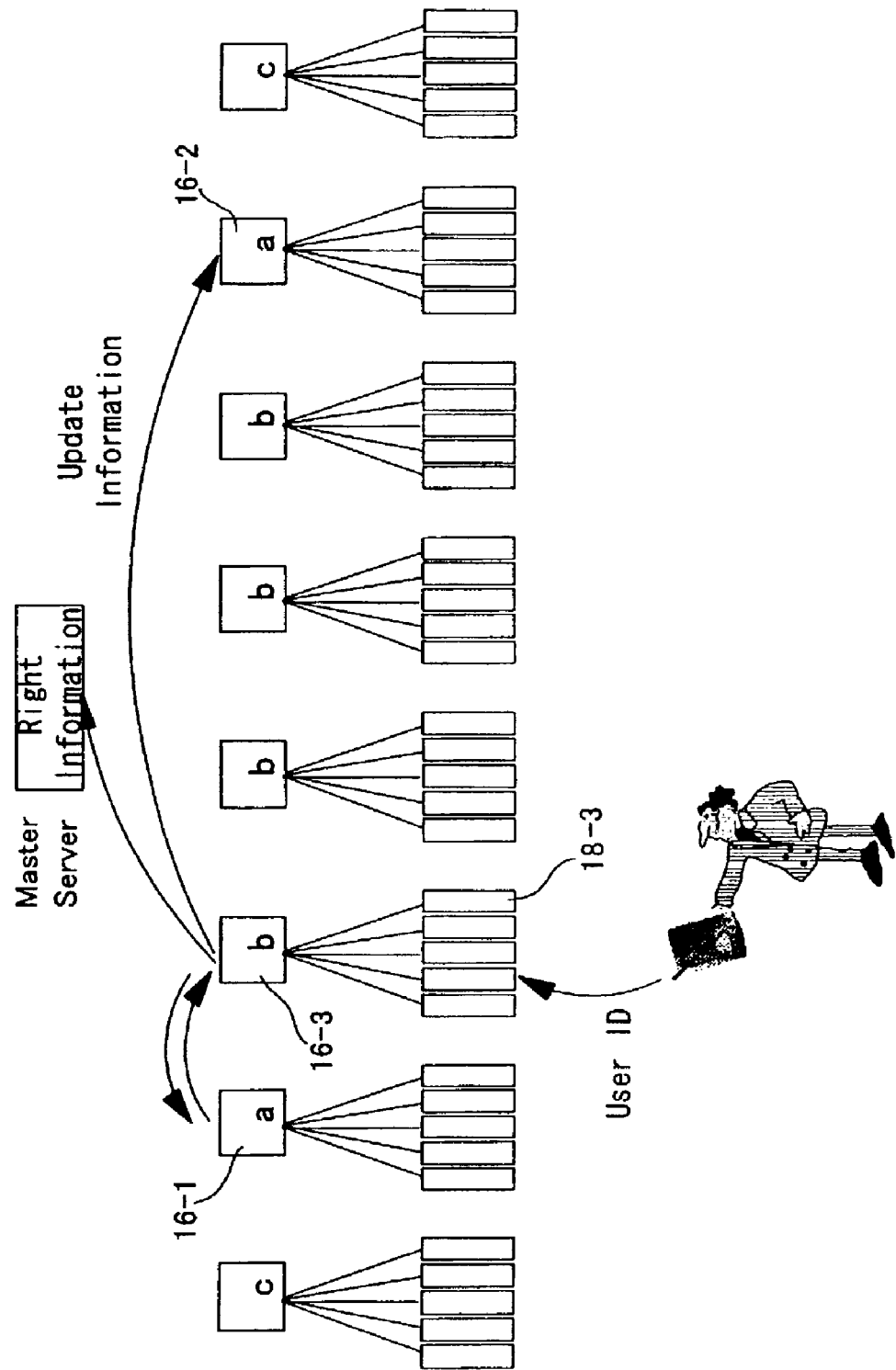
FIG. 7 shows an embodiment when a user get on a train from a station not registered in the right information 22.

FIG. 7 shows an embodiment when the user has got on the train from the station not registered in the right information 22. The embodiment shown in FIG. 7 will be explained in detail; the user has reserved a ticket from Tokyo to Shin-Osaka by specifying date and a train to get on and the information has processed to generate as the right information 22 in the master server 14. The right information 22 are distributed to each of the local servers 16-1, 16-2 and 16-3 as the sub-right information generated from the predetermined information depending on the ranking of the local server.

The local server 16-3 first confirms the presence of the sub-right information corresponding to the read out user ID stored therein. Next, the effective term information is referred if the sub-right information is constructed to include the effective term information, and if not being in the effective term, the entrance can not be allowed. The local server 16-3 further examines the usage information and does not permit the entrance if the used out flag has been already set. The local server 16-1 is inquired by pointer information for effectiveness of the right corresponding to the user ID to examine the cancel or change, that is, whether or not the electric ticket ID corresponding to the electric ticket information has been deleted.

If the above conditions are fulfilled, the inquired local server 16-1 updates the enter flag and sends the entrance information to the master server 14 and the local server 16-2 placed at the destination location for updating the entrance flag. The local server 16-1 issues at the same time the entrance permission signal to the local server 16-3 for allowing the user to pass through the automatic ticket gating machine.

Figure 8:
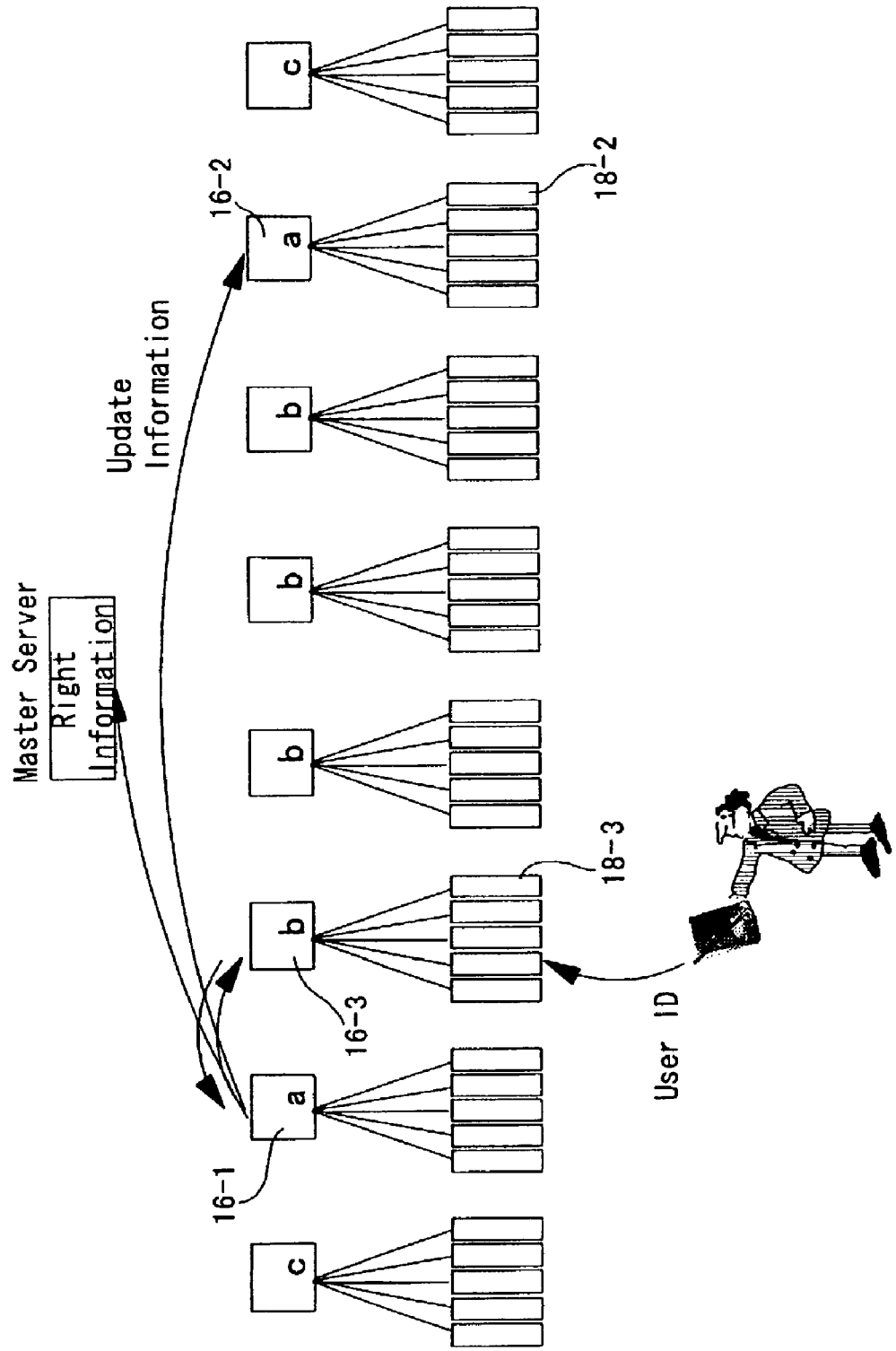
FIG. 8 shows another embodiment of the process of the local server according to the present invention.

FIG. 8 shows an alternative embodiment of the local server process according to the present invention. In the embodiment described in FIG. 8, the local server 16-3 acknowledges the access to the entrance to the local server 16-1 by the pointer information after receiving the user ID. The local server 16-1, when acknowledged, sends the usage of the right in relation to the electric ticket after verification of the right using the user ID to the master server 14 and the local server 16-2 with referring to the user ID and/or the right information ID to update the enter flag. At the same time, the entrance permission signal is send to the local server 16-2 so that the user is allowed to enter through the entrance and exit management means 18-2 associated to the local server 16-2. As described in the embodiments shown in FIG. 7 and FIG. 8, functions of the local servers from 16-1 to 16-3 may be adequately adopted so as to distribute overheads to each of the servers.

Figure 9:
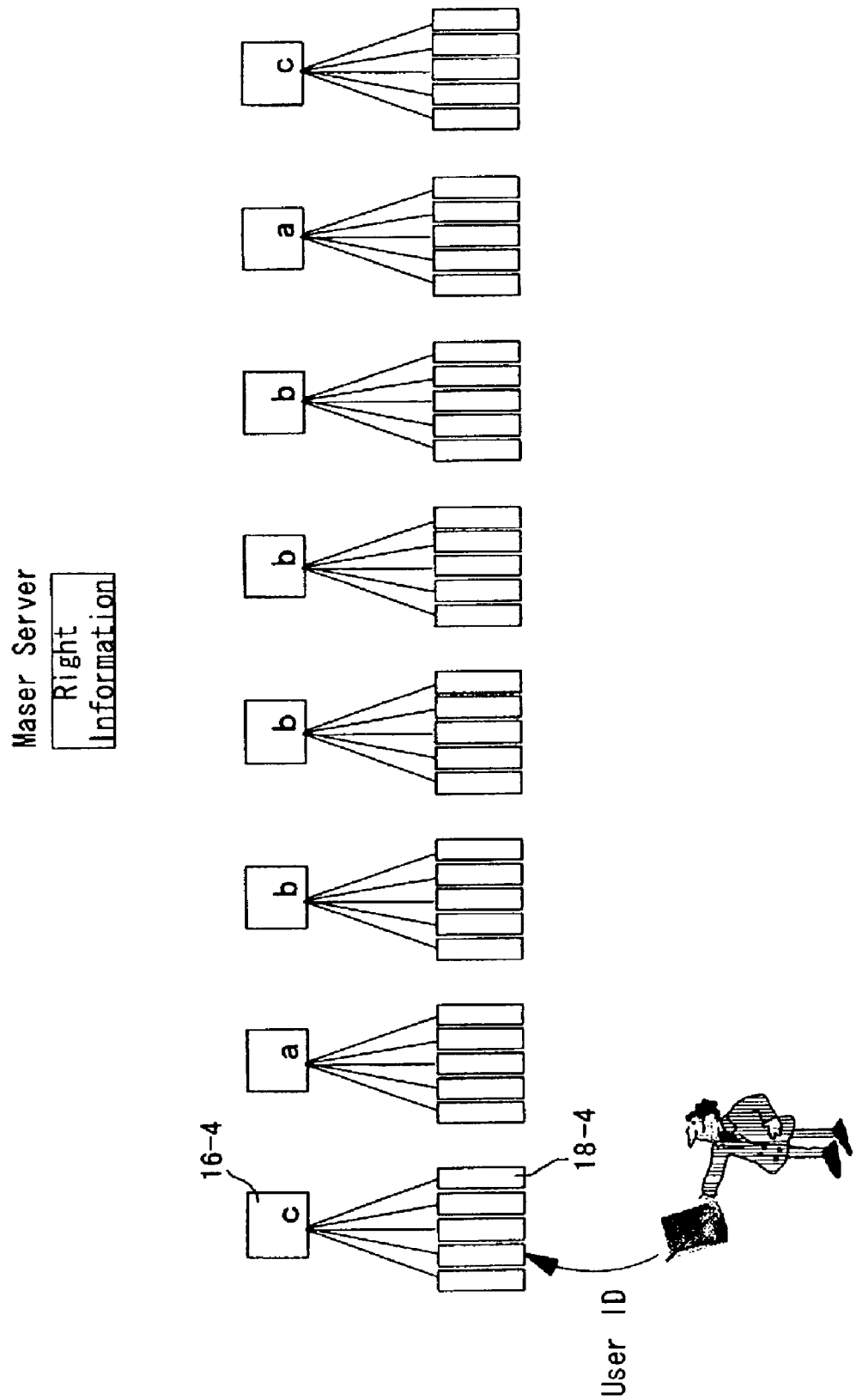
FIG. 9 shows another embodiment of the process of the local server 16 according to the present invention.

FIG. 9 shows further another embodiment describing the process of the local server 16. In the embodiment shown in FIG. 9, for example, no sub-right information corresponding to the user ID is distributed to the local server 16-4. When the user has the user ID read from the portable recording means 32 carried by the user with the intention to pass through the entrance and exit management means 18-4 such as the automatic ticket gating machine, the local server can not find the sub-right information corresponding thereto even if the read data are sent to the local server 16-4. Then the entrance permission signal through the local server 16-4 is not sent to the entrance and exit management means 18-4 and the entrance and exit management means 18-4 does not open the gates or provides alarms. In this embodiment, no pointer information, is also find and therefore, the other local servers receives no inquiry thereby resulting in refusal of the entrance of the user. For example, the embodiment shown in FIG. 9 corresponds the case where the user gets on the train from the Tokyo Station in the Yamanote-line though the reservation has made, for example, from the Shin-Yokohama station to Shin-Osaka station.

Figure 10:
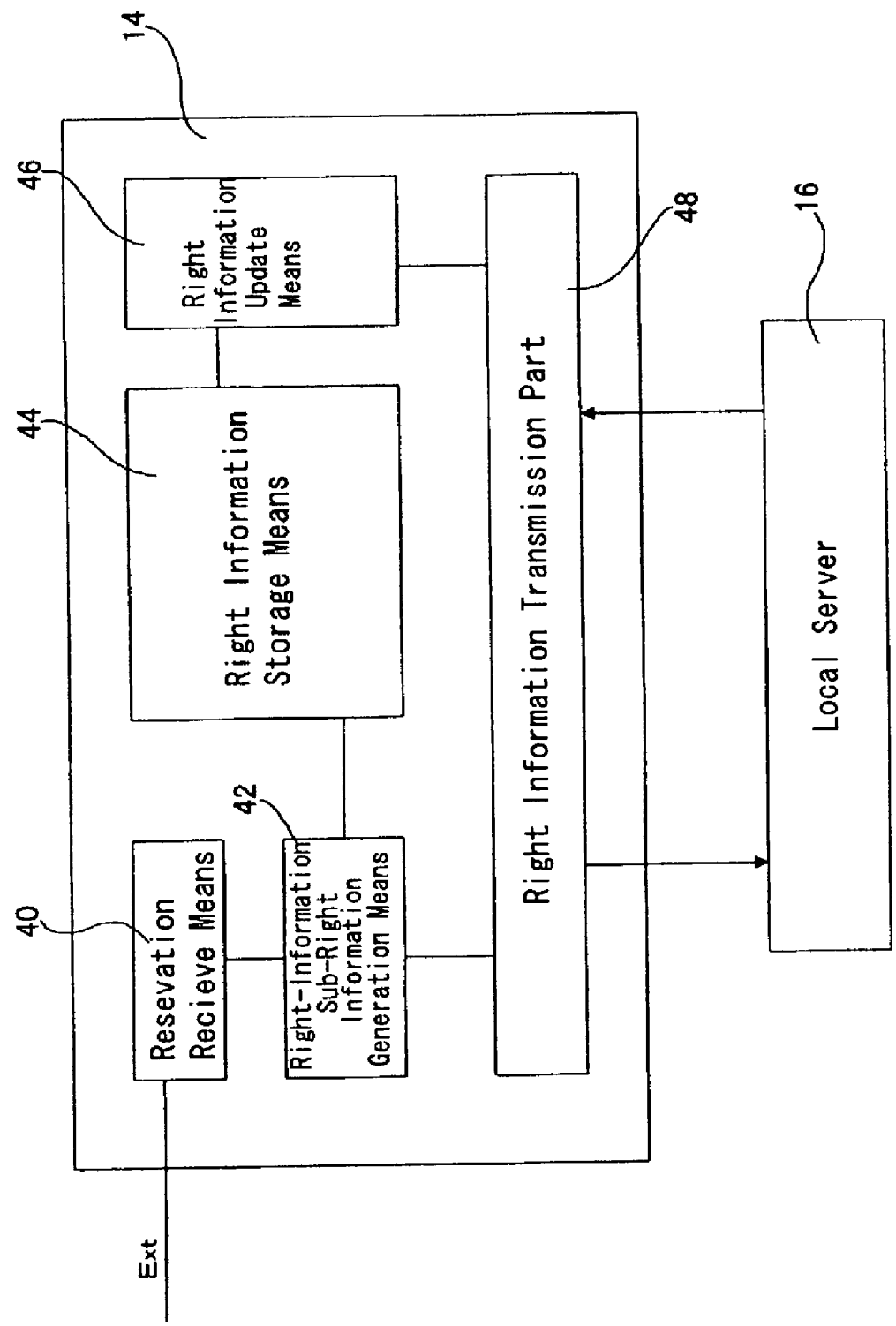
FIG. 10 shows a block diagram of the master server possibly used in the present invention.

FIG. 10 shows a block diagram of the construction of the master server 14 used in the present invention. As shown in FIG. 10, the master server 14 comprises the reservation receiving means 40 for receiving reservations from users through the external transmission means "Ext"; the right information generating means 42 for generating the right information from the information provided by the reservation receiving means 40; the right information storage means 44 for storing the generated right information; the usage information update means 46 for updating the entrance and exit flag included in the usage information of the stored electric ticket information; and the information transmission part 48 for transmitting between the master server 14 and each of the local servers 16. In the present invention, the right information storage means 44 may be constructed with including the database 20. In the present invention, each of the means may be constructed by implementing software described using non-object oriented programming technology or object oriented programming technology.

The master server 14 shown in FIG. 10 accepts the reservations from the user and generates the right information 22 comprising the information shown in FIG. 3 upon request from the users and the right information may be stored in the right information storage means 44 etc. The right information stored in the right information storage means 44 may be automatically deleted or changed in their storage region depending on the above described effective term information. The master server 14 further may be constructed to distribute to the local servers 16 the right information with which the local server uses in the next processes using a distribution table depending on the characteristics of the right information. The distribution table may be stored in the master server 14 as the construction that the information transmission means 48 may refer thereto.

Figure 11:
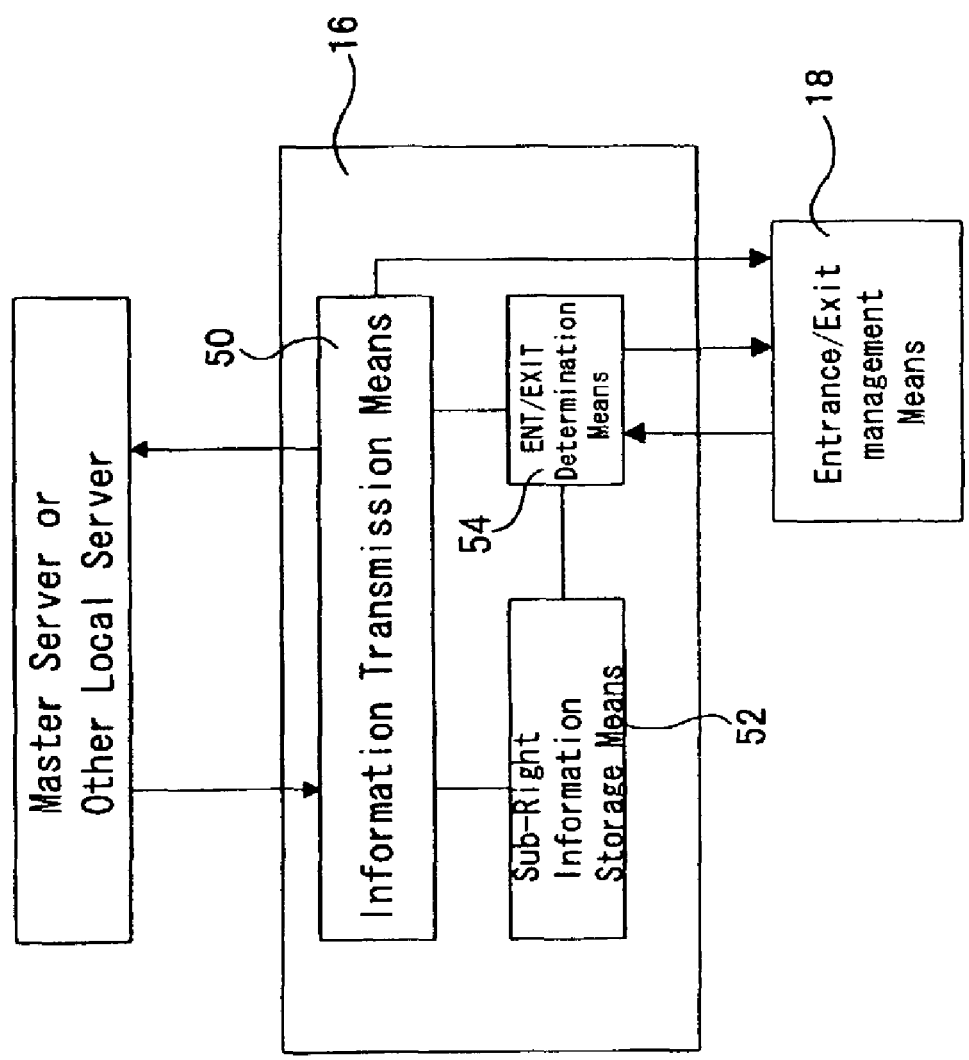
FIG. 11 shows a block diagram of the embodiment of the local server which is connected to the master server and receives the sub-right information while managing practical entrance and exit.

FIG. 11 shows a block diagram of the embodiment of the local server 16 which receives the sub-right information and manages the practical entrance and exit. The local server 16 each may be constructed to have generally similar construction, and comprises the information transmission means 50 for receiving updated sub-right information and the information storing means 52 for storing the sub-right information.

The information transmission means 50 outputs to the entrance and exit management means 18 the entrance permission signal obtained from other local server by inquiring to the other local server. The information transmission means 50 also controls the entrance and exit management means 18 shown in FIG. 11 using the entrance permission signal issued by the other local server.

The information transmission means 50 receives and stores the updated sub-right information and inquires to the other local servers 16 when the sub-right information not stored therein is requested from the entrance and exit management means 18 so that the local server 16 receives the entrance permission signal generated based on the sub-right information stored in the other local servers inquired.

In addition, the entrance and exit management means 18 is connected to the local server 16 shown in FIG. 11. According to the present invention, the entrance and exit management means 18 may include an automatic ticket gating machine being possible to read the information stored in the portable storage means such as an IC card. The entrance and exit management means 18, as shown in FIG. 11, comprises generally a user ID reading means, a read signal transmission part and an entrance permission signal transmission part (not shown), and these are comprised from any known means so far.

Figure 12:
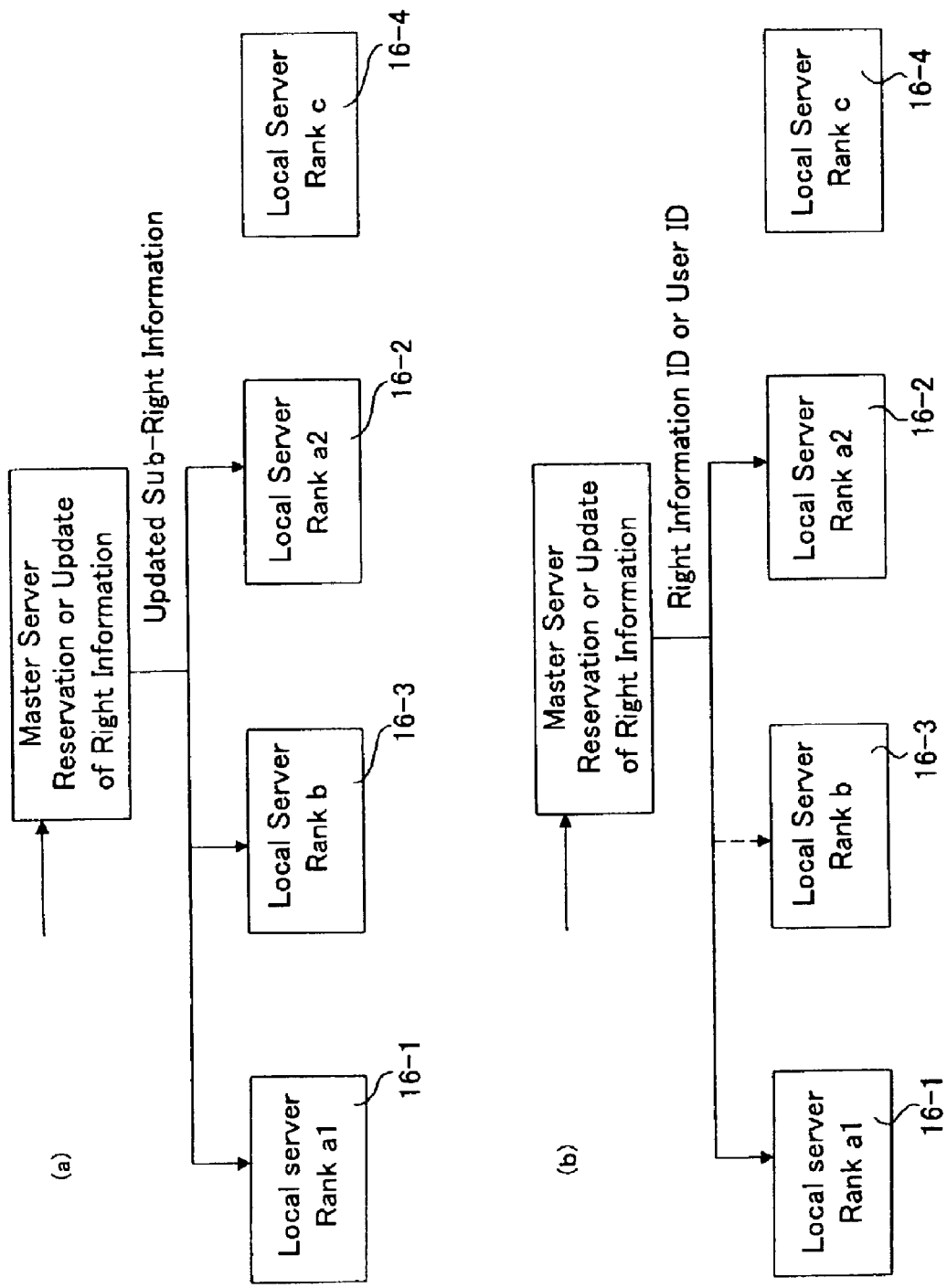
FIG. 12 shows the operations between the master server and each of the ranked local server 16 when updating (including change) and canceling the information of the right information.

FIG. 12 shows operations of the master server 14 and each of the local server 16 provided with rankings when the right information is subjected to update (including change) or cancel thereof the according to the present invention. Hereafter, the ranking provided about the local server will be detailed. In the present invention, for example, stations on rail road lines are categorized into the get-on and get-off stations, midway stations, and stations other than got-on, get-off and midway stations. In addition, for example, when the present invention is applied to public facilities such as a concert hall, a theater, an amusement place, ranking "a" may be provided with a local server placed at a front entrance gate. Ranking "b" is provided with a local server placed at a back entrance where less amounts of users pass through. Other kinds of categories than 2 for the local servers may be provided in the present invention.

The ranking as described above will be explained using a particular embodiment such as the reservation of a passenger trains for the rail way, and the ranking may be categorized as follows:

Rank "a"> a first kind of local server to which an automatic ticket gating machine is connected for allowing users to enter and to exit (such as the departure station and the destination station in the boarding section).

Rank "b"> a second kind local server to which an automatic ticket gating machine is connected for allowing users to enter and to exit (such as halfway stations between the departure station and the destination station).

Rank "c"> a local server to which an automatic ticket gating machine is connected for refusing users to enter or to exit (stations not corresponding to any of the departure station, the destination station, and the halfway stations).

To rank the local server to the ranks of "a", or "b", or "c" may be determined depending on each of the right information with relation to characteristics of the right information. In an alternative embodiment for the railway application, local servers to which an automatic ticket gating machine at the station accessed by quite many users may be provided with the rank "a". The rank "b" may be provided with a local server to which an automatic ticket gating machine at the station accessed by less users is connected.

The right information may be distributed from the master server by selecting the information depending on the rankings of each local server as follows:

Rank "a"> to the corresponding local server, all of the right information ID, the right content information, the user ID, the effective term information, and the usage information etc. may be transmitted.

Rank "b"> to the corresponding local server, the user ID, the effective term information, the pointer information for indicating the local server to inquire enter and exit flags information.

Rank "c"> to the corresponding local server, no reservation information is not transmitted.

Now, the present invention will be further described using FIG. 12. FIG. 12(*a*) shows the process for accepting the reservations from the user or for accepting the change of the reservation. The master server 14 generates the corresponding right information 22 and then registers to the right information storage means 44 implemented in the master server 14 when accepting a new request for the reservation. Then the master server generates the right information ID and the sub-right information according to the above described standards identified by the right information ID. The master server 14 distributes the sub-right information to the local server 16-1, the local server 16-2, and the local server 16-3 to make the local servers 16 possible to process the entrance and exit.

FIG. 12(*b*) shows the process executed by the master server 14 when canceling the reservation according to the present invention. When accepting the request for cancel of the reservation from users, the right information stored in the right information storage means 44 is specified by the right information ID etc. Then the specified right information is deleted or shifted to another storage region for latter referencing so that the master server 14 or the local servers 16 may not refer the corresponding right information. In addition, the present invention may adopt the construction with providing a delete flag with the electric ticket information such that the local server 16 can not refer thereto by referring the delete flag. In the case of cancel of the right information from users, for example, the master server 14 may transmit only right information Ids to the local server 16-1 and local server 16-2 storing the corresponding right information. Then the corresponding right information may be deleted from the information storage means.

Figure 13:
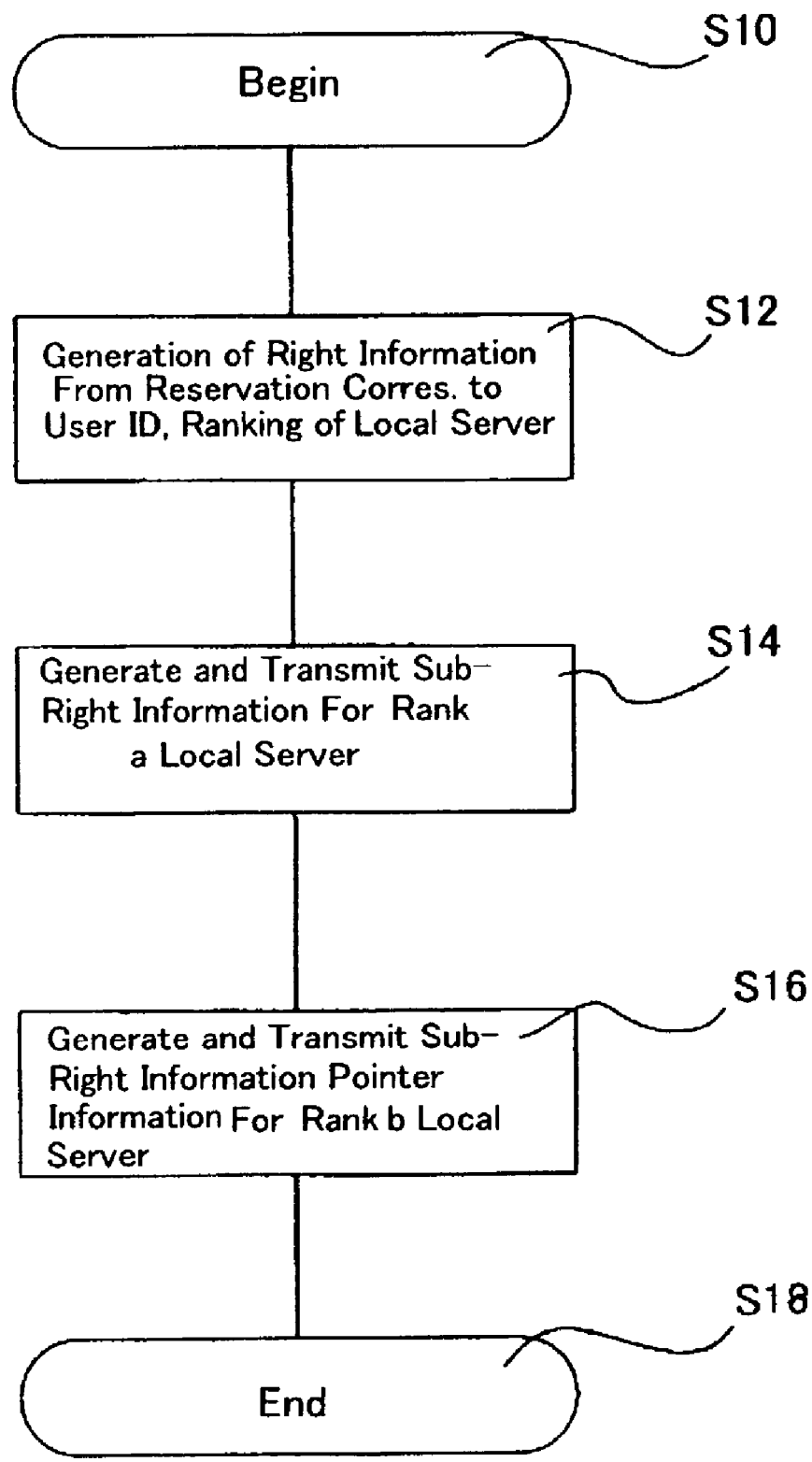
FIG. 13 shows a flowchart of the process of the master server 14 when the reservation is received and canceled shown in FIG. 12.

FIG. 13 shows the flowchart of the process of the master server 14 executed therein when receiving the reservation shown in FIG. 12(a). The process of the master server 14 as shown in FIG. 13 starts from the step S10 and proceeds to the step S12 to receive the request including the information described in FIG. 3 with mating the user ID. Then the process proceeds to the step S14 to generate the sub-right information from the received information and then transmits it to the rank "a" local server. In the step S16, the similar procedure is executed and the sub-right information is transmitted to the rank "b" local sever and the proceeds to the step S18 and a program is terminated.

For providing the rankings shown in the steps S14, S16, a ranking table may be used. The ranking table may be constructed according to any known method depending on the particular application. Detail for providing the ranking will be explained in examples described later. The process for reservation of the master server 14 ends at the step S18 after the steps described above.

Figure 14:
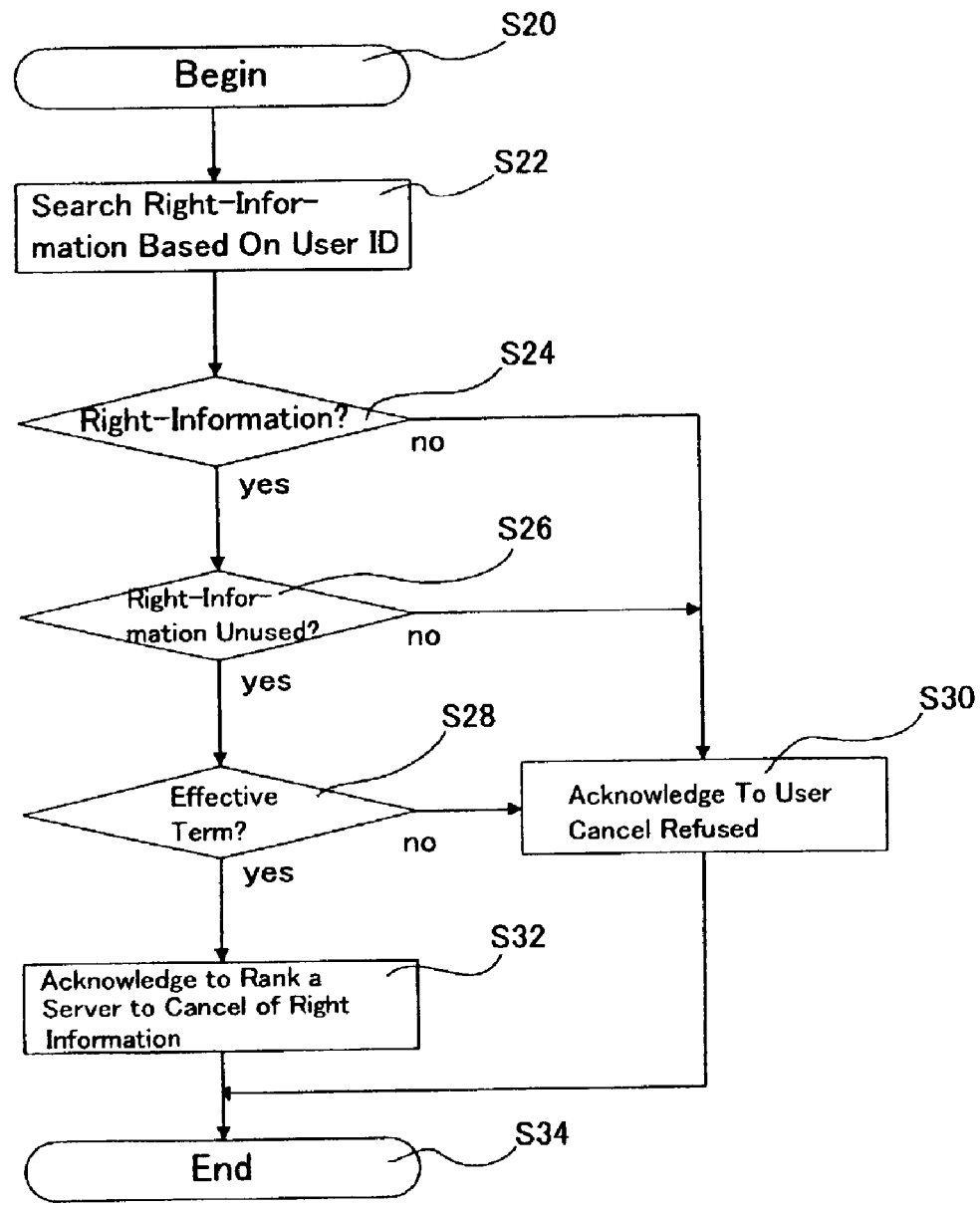
FIG. 14 shows a flowchart of the process of the master server when the reservation is canceled.

FIG. 14 shows the process of the master server 14 for canceling the reservation according to the present invention: At the time when canceling the reservation, the master server 14 starts the process from the step S20 and specifies the right information in relation to the reservation from the user ID. When the user has a plurality of reservations at the same time, input of the right information ID may be requested. Further in the step S24, the process determines whether or not the sub-right information is stored, and if so (yes), the process determines whether or not the reservation is still unused in the step S26. If so (yes), the process proceeds to the step S28 and determines whether or not the reservation is still with in the effective term.

If the reservation is used (no), the cancel can not be allowed, and then the process returns to the user the cancel not allowed. The determination of the step S28 returns still within the effective term (yes), then the process makes the corresponding electric ticket information to be not being referred by the local server 16 in the step S32 by using the methods such as deletion of the information, the change of the storage region, or setting deletion flags for the corresponding electric ticket stored in the electric ticket storage means 44. At the same time, the process issues to the local server 16-1 and/or the local server 16-2 instructions to delete the electric ticket information specified by the corresponding electric ticket ID, and proceeds to the step S34 to end. On the other hand, if the effective term of the electric ticket information related to the reservation has already expired (no), the acknowledgment that the cancel can not be allowed is issued to the user in the step S30 and the cancel process ends at the step S34.

Figure 15:
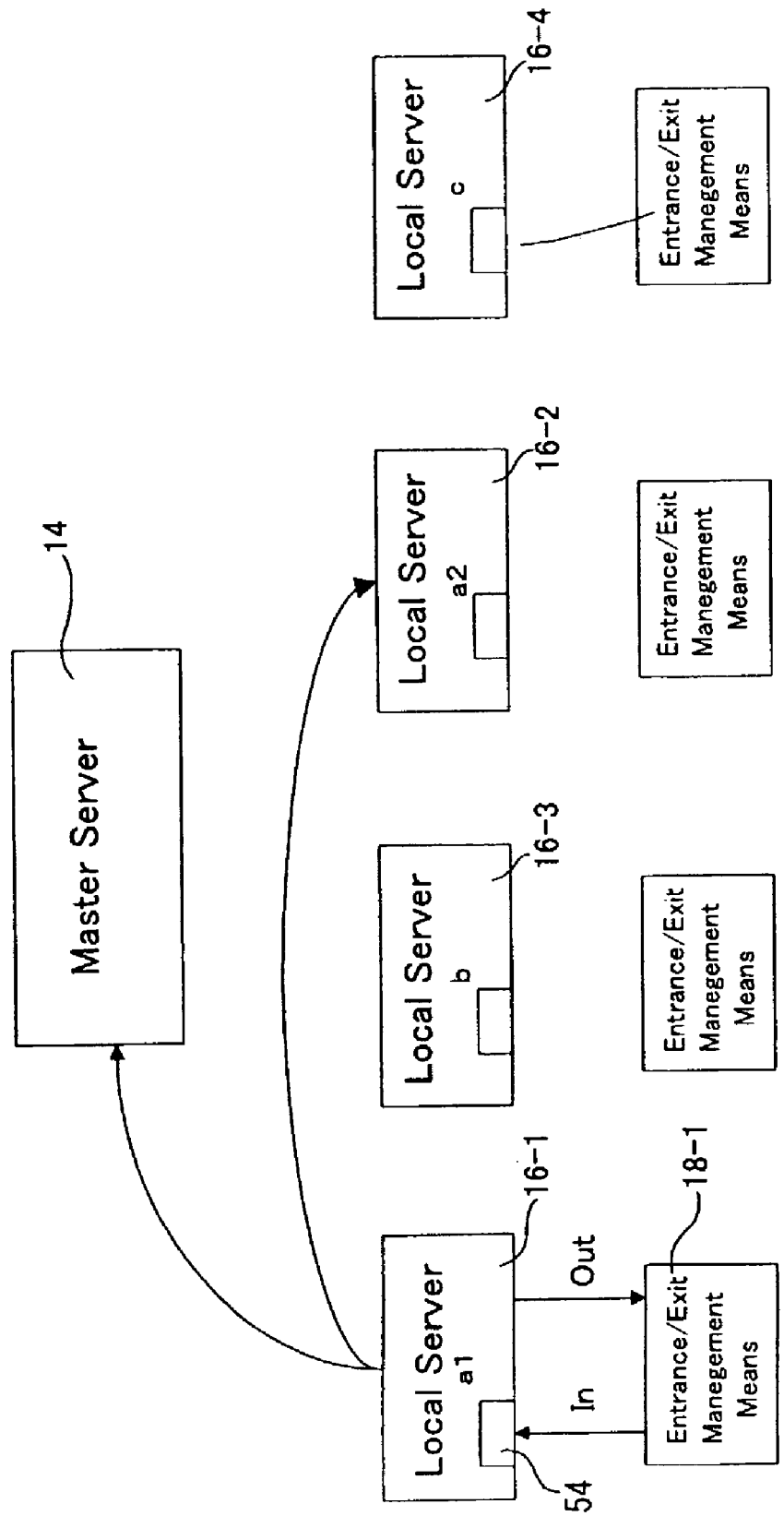
FIG. 15 shows a process of the local server when the user get on the train from the local server 16-1.

FIG. 15 shows the local server process when the user gets on the train from the local server a1. In the embodiment shown in FIG. 15, the user tries to enter from the local server 16-1 (rank a1) and has the entrance and exit management means to read the information stored in the portable storage means 18-1. The read user ID is sent to the entrance and exit permission determination means 54 through the line "In". In turn, the entrance and exit permission determination means 54 searches from the electric ticket information storage means 52 implemented in the local server 16-1 the right information already distributed from the master server 14 and accumulated therein to determine whether or not the right information corresponding to the user ID has already distributed to the local server 16-1.

The local server 16-1 is the boarding station with respect to the right information and then the entrance permission signal is sent from the local server 16-1 to the entrance and exit management means 18-1 through the line "Out" thereby causing to open the gates of the automatic ticket gating machine of the entrance and exit management means 18-1 to permit the user to enter therein. In turn, the local server 16-1 issued the entrance permission signal immediately sends the update acknowledgment to the master server 14 and the local server 16-2 placed at the destination station using the pointer information included in the sub-right information that verified entrance has been made based on the right specified by the corresponding user ID. In addition, according to the present invention, the date of the actual entrance may be transmitted to the master server 14 and the local server 16-2 placed at the destination station as the timestamp.

Figure 16:
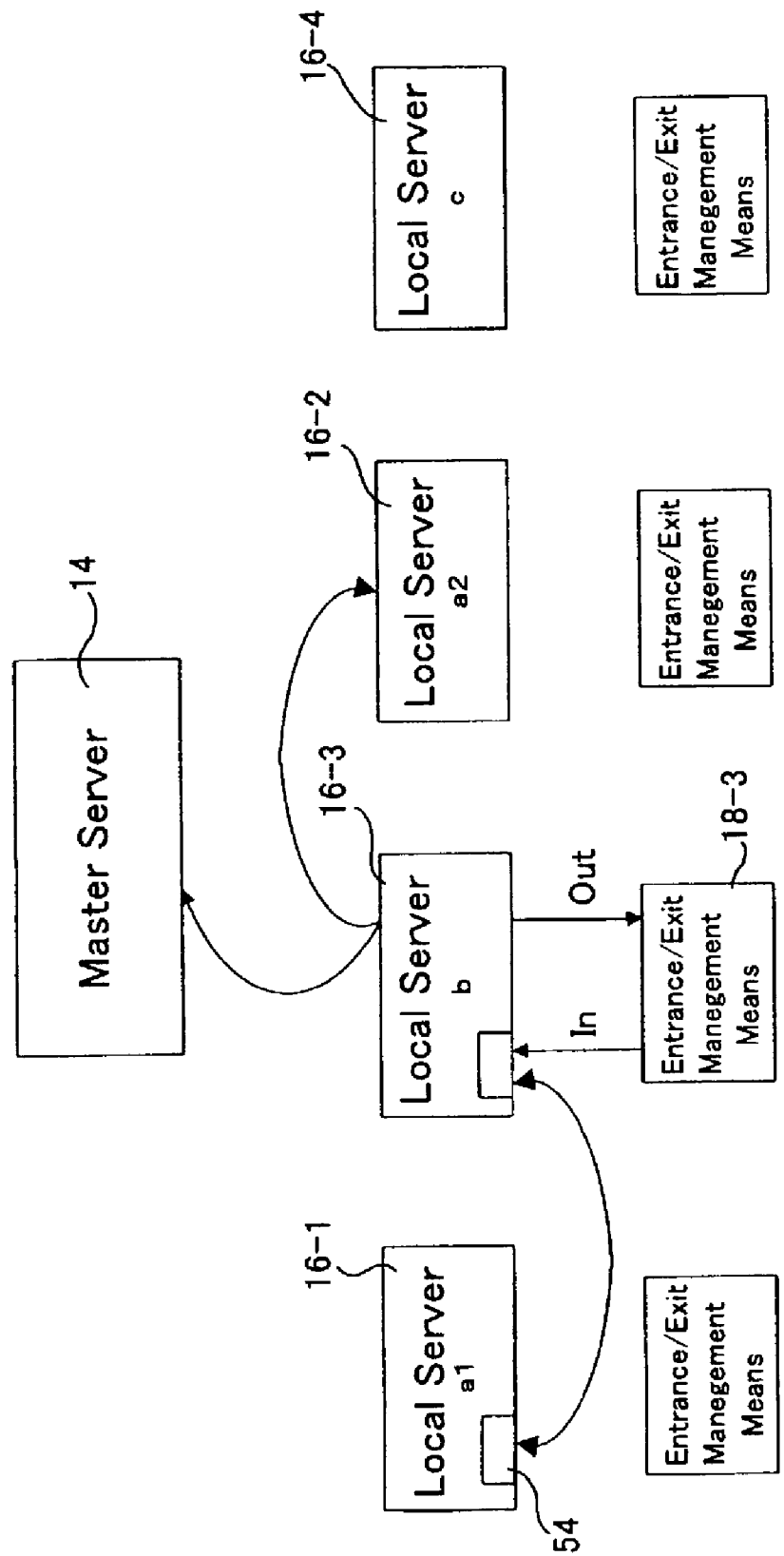
FIG. 16 shows an embodiment according to the present invention when the user get on the train from a halfway station.

FIG. 16 shows the embodiment when the user gets on the train from the halfway station according to the present invention. The user tries to enter from the local server 16-2 (rank b) and has the entrance and exit management means 18-3 read the information of the portable storage means. The read user ID are sent to the entrance and exit permission determination means 54 through the line In. The sub-right information are determined whether or not the sub-right information has been already distributed from the master server 14 from the local server 16-3 by searching the user IDs distributed from the master server 14 and accumulated therein.

When the local server 16-3 finds the information such as the user ID as the result of searching, the local server 16-3 inquires to the local server 16-1 by sending, for example, the user ID thereto. The local server 16-1 are the boarding station with respect to the reservation, and the much information are send from the master server 14. The local server 16-1 determines the entrance permission in response to the inquiry to issue the entrance permission signal. The local server 16-3 received the entrance permission signal sends the received entrance permission signal to the entrance and exit management means 18-3 through the line "Out" thereby causing to open the gates of the automatic ticket gating machine of the entrance and exit management means 18-3 to permit the user to enter therein to enjoy the service.

The local server 16-3 transmits immediately the entrance flag that indicates the entrance has been made adequately to the master server 14 and the local server 16-2 placed at the destination station using the pointer information included in the sub-right information.

Figure 17:
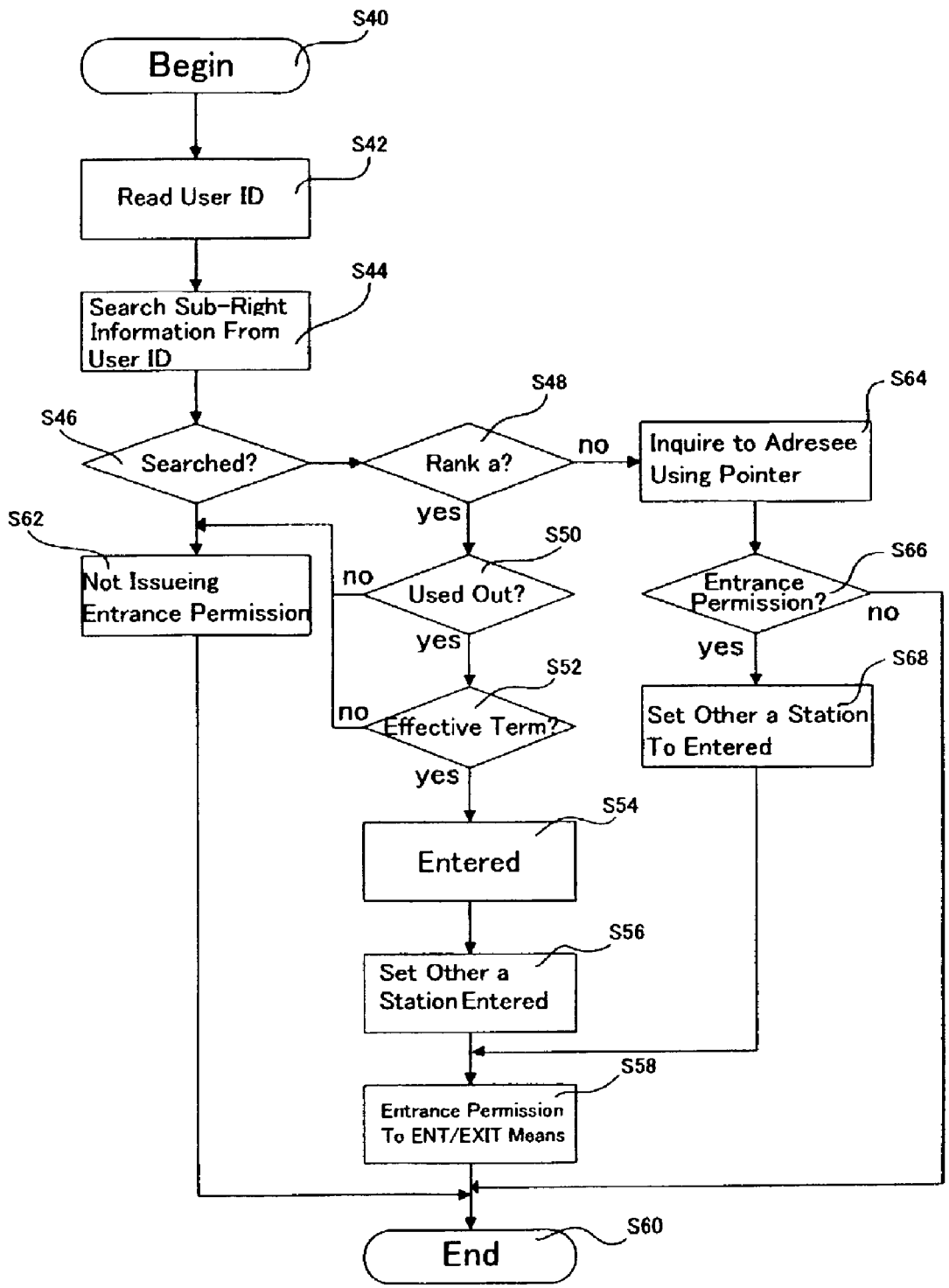
FIG. 17 shows a server process of the local server at the entrance.

FIG. 17 shows the server process of the local servers according to the present invention when processing the entrance. The local server process according to the present invention starts from the step S40 and proceeds to the step S42 to read the user ID. In the Step S44, the sub-right information stored in the local server is searched by referring to the user ID. In the Step S 46, if the right information ID is found (yes), further determines whether or not the local server placed at the corresponding station is registered to be the rank "a". This determination is performed by judging whether or not all or part of the information shown in FIG. 3 is sent, or by judging whether or not the corresponding station to which the local server is placed are described in the boarding section information.

When the judgment has been made that the corresponding station is the rank "a" station (yes), the process proceeds to the step S50 to determine whether or not the service in relation to the sub-right information has been used out. If the service is not used yet (yes), further the process judges the effective term. If so (yes), the process sets the enter flag within the usage information included in the sub-right information and together sends the enter flag to the rank "a" local server placed at the destination station in the step S56 to modify the sub-right information. Then the corresponding local server also issues the entrance permission signal to the entrance and exit management means to cause the gates to open and the process is terminated at the step S60.

On the other hand, If the user ID has been found in the step S46 (no), the corresponding local server determines itself to be the rank "c" station, and does not send the entrance permission signal to the entrance and exit management means in the step S62 such that the gates have been kept closed or the alarms are provided and the process terminates at the step S60.

In the step S48, if the judgment that the corresponding local server stores the restricted sub-right information has been made (no), the corresponding local server should be the rank "b", and then the local server inquires to the rank "a" local server using the pointer information in the step S64 to make search based on the user ID to determine in the step S66 whether or not the entrance permission signal should be issued. If the entrance permission signal is issued (yes), the acknowledgment thereof is sent to the rank "a" station in the step S68 thereby having set the enter flag to the electric ticket information and further the process proceeds to the step S58 to issue the entrance permission signal to the entrance and exit management means.

In the embodiment shown in FIG. 17, further to the above, when the electric ticket has been used and the effective term has expired (no), the process proceeds to the step S62 and does not permit the entrance and exit and the process is terminated in the step S60.

Figure 18:
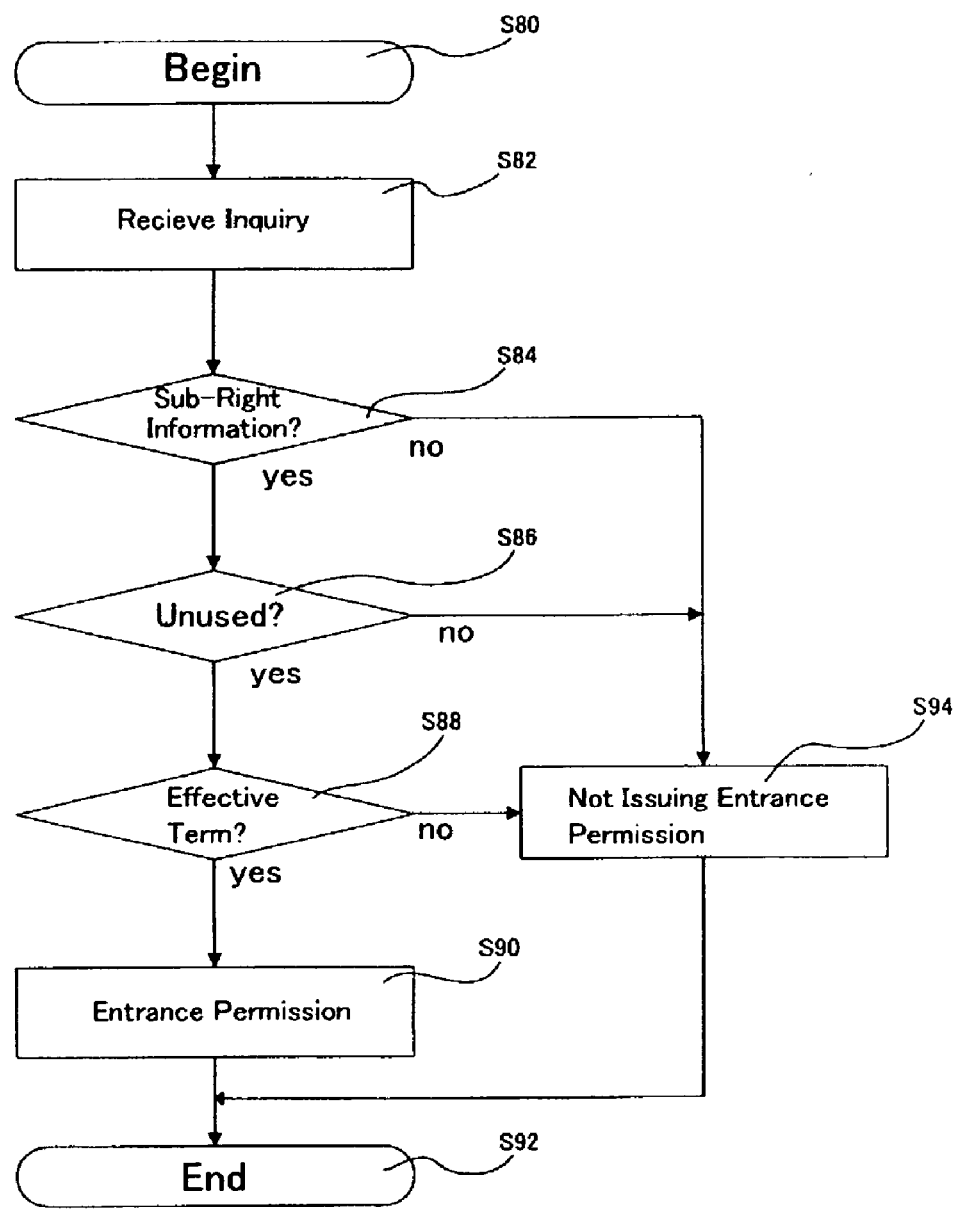
FIG. 18 shows a detailed process of the local server designated by the pointer in the step S64 described in FIG. 17.

FIG. 18 shows the detailed process of the local server designated by the pointer in the step 64 described in FIG. 17. The process of the local server starts from step S80 and proceeds to the step S82 to receive the inquiry from the rank "b" local server. The local server that has received the inquiry determines by referring to the user ID whether or not the electric ticket information specified by the user ID has been distributed from the master server in the step S84. If the electric ticket information corresponding to the user ID is found in the addressed local server for the inquiry (yes), further the determination whether or not the service in relation to the electric ticket information has already used in the step S86.

In the step S86, if the service related to the electric ticket information is not used yet (yes), the process further judges the effective term of the electric ticket information. If so (yes), the entrance permission signal is issued to the rank "b" local server which has executed the entrance procedure in the step S90, and then the local server process for being addressed to the inquiry in the step S92. Alternatively, if each of the determination in the step S84, S86, and S88 returns negative results, the program diverts to the step S94 for each determination and does not permit the entrance of the user by providing actively an entrance refusal signal or by not providing the entrance permission signal.

Figure 19:
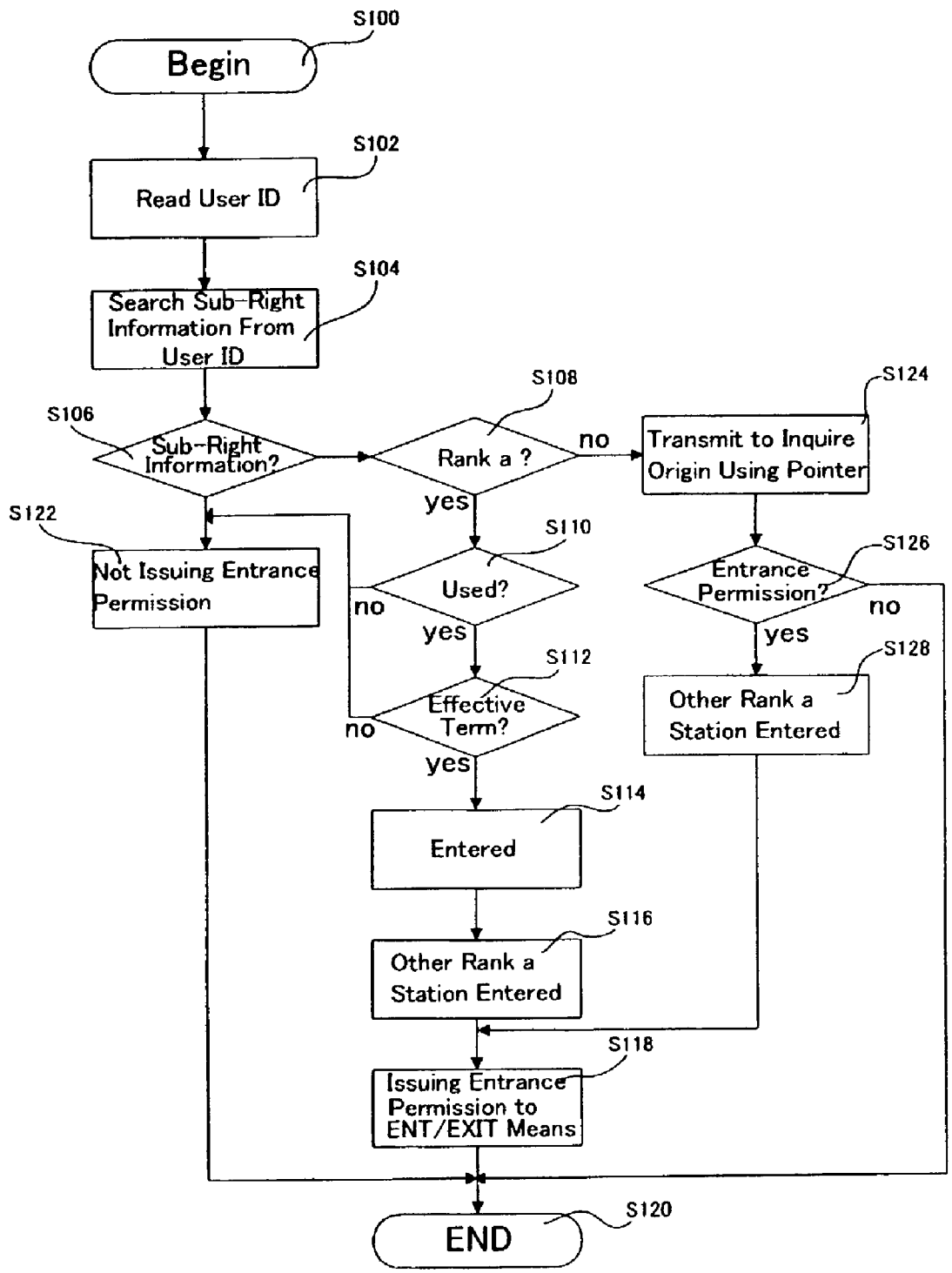
FIG. 19 shows a flowchart of the process of the local server for the exit process.

FIG. 19 shows the detailed flowchart of the local server for executing an exit procedure. The process of the local server, which executes the exit procedure according to the present invention, starts from the step S100 and proceeds to the step S102 to read the user ID trying to pass through the entrance and exit management means with the intention to exit. In the step S104, the electric ticket information is searched with referring to the read user ID. In the step S106, if the user ID is found (yes), further the process proceeds to the step S106 and determines whether or not the station itself is registered as rank "a".

In the step S108, if the determination that the station itself is to be the rank "a" station has been made (yes), then the process determines whether or not the service with respect to the sub-right information has been entered to use them. Then the enter flag indicating the entry to use the service is judged. If the enter flag is found (yes), further the effective term is judged in the step S112, if so (yes), an exit flag and a used out flag are set to the usage information included in the sub-right information in the step S114. Then in the step S116, the exit flag and the used out flag are transmitted to the rank "a" local server placed at the destination station to modify the electric ticket information. Then the local server issues the entrance permission signal to the entrance and exit management means to have the gates etc. open in the step S118 and the local server process is terminated at the step S120.

On the other hand, if the electric ticket ID is found (no) in the step S106, the corresponding local server determines itself to be rank "c" in the step S122 and then send no entrance permission signal to the entrance and exit management means not to open the gates or providing alarms. The local server process is terminated in the step S120.

In the step S108, if the local server stores the restricted electric ticket information (no), the local server is to be rank "b", and the process proceeds to the step S124 and inquires to the rank "a" local server using the pointer information and in the step S126 determines whether or not the entrance permission signal is acknowledged while referencing the electric ticket ID. When the entrance permission signal is sent (yes), the local server acknowledges to the rank "a" server to have the enter flag set included in the electric ticket information and the process proceeds to the step S118 to issue the entrance permission signal to the entrance and exit management means.

Further to the above, in the embodiment described in FIG. 19, if the electric ticket has used out (no) and if the effective term has expired (no), the process proceeds to the step S122 to terminate the process.

Figure 20:
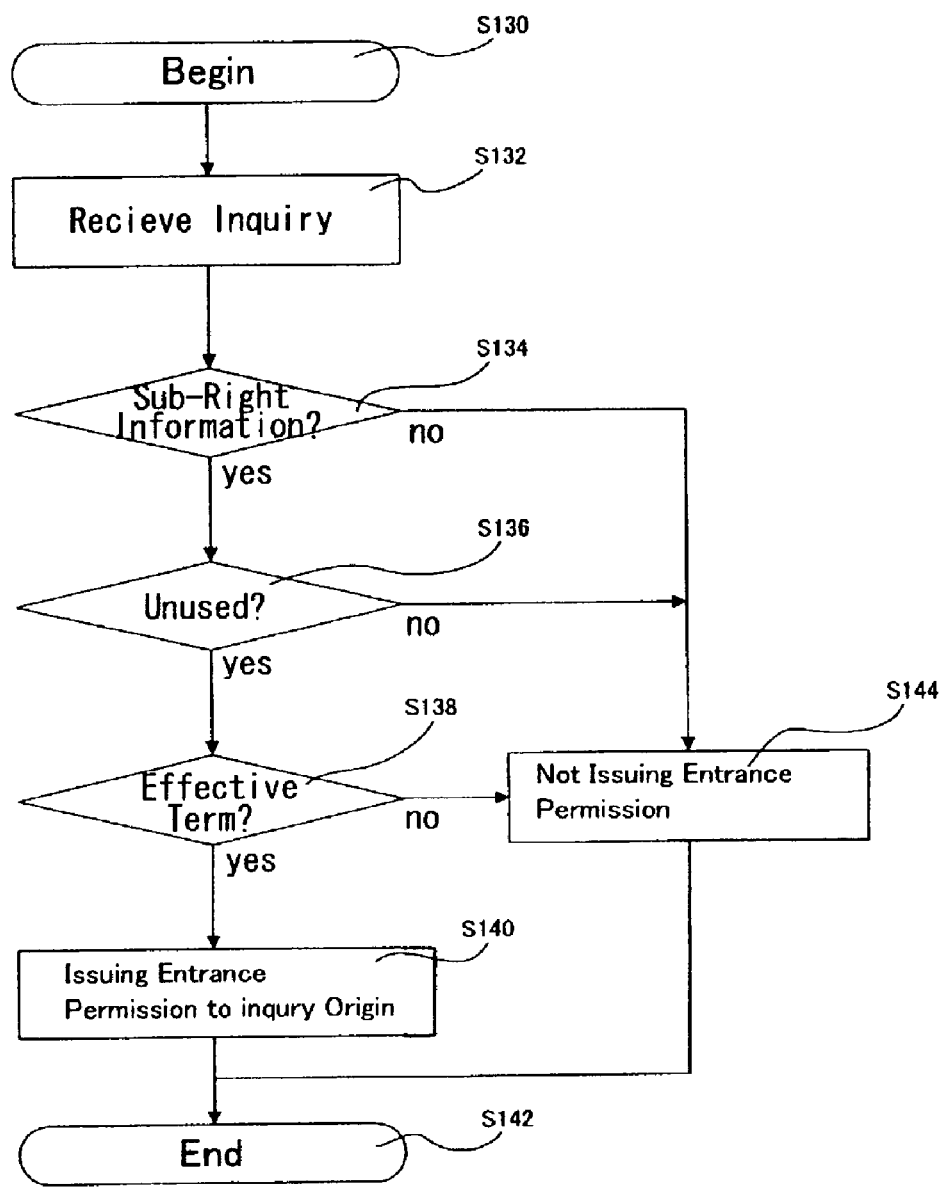
FIG. 20 shows a detail of the process of the local server designated as rank "a" at the exit.

FIG. 20 shows a detailed process in the local server designated to rank "a" when exiting. The process of the local server designated by the pointer starts from the step S130 and receives the inquiry from the rank "b" local server in the step S132. The local server received the inquiry determines whether or not the sub-right information specified by the user ID is distributed from the master server by referencing the user ID in the step S134. The electric ticket information corresponding to the referenced user ID is found in the inquired local server (yes), further the determination is made in the step S136 whether or not the service related to the sub-right information has already used out.

In the step S136, if the service related to the sub-right information has not used out yet (yes), the determination of the effective term of the electric ticket information is made in the step S138, and if so (yes), the entrance permission signal is transmitted to the rank "b" local server. In the step S142, the local server process of the local server addressed to the inquiry is terminated. Each of the determinations of the steps S134, S136, 138 returns refusal results (no), the program diverts to the step S144 in any case and the entrance of the user from the rank "b" local server is refused by providing the entrance refusal signal actively or by not providing the entrance permission signal.

In the present invention, the overhead to the master server and each of the local servers are allowed to be effectively shared so that speed-up of the entrance and exit procedure may be achieved by providing high efficiency of the entrance and exit management as well as enhancing reliability of the electric ticket information.

Figure 21:
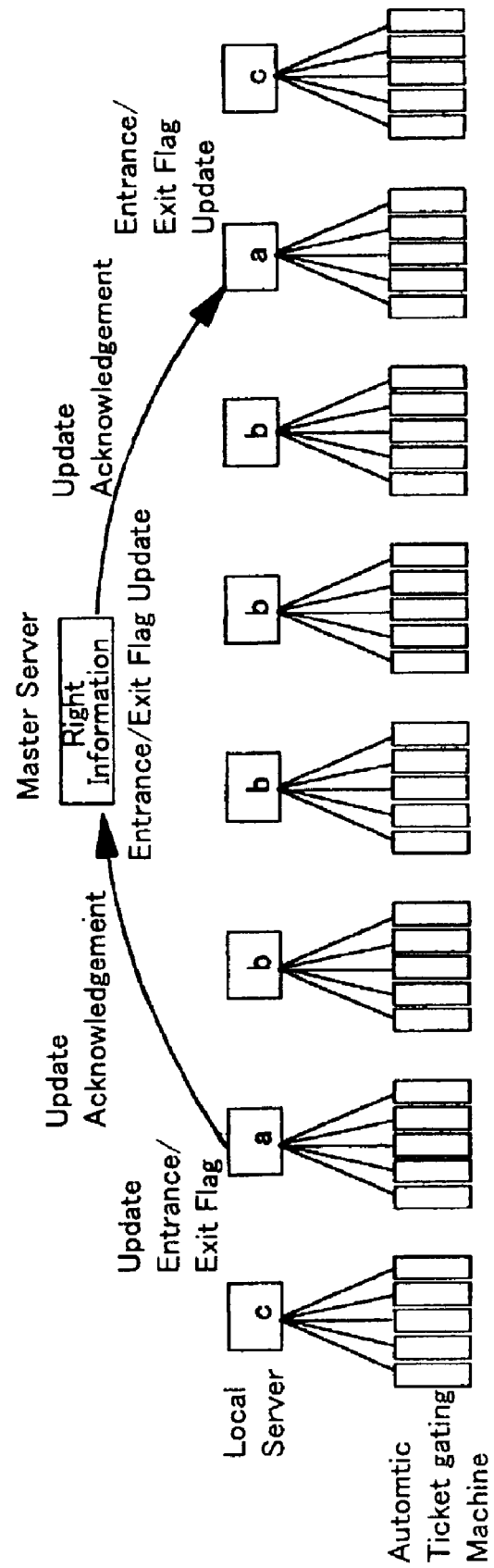
FIG. 21 shows another embodiment with respect to the update of the usage information according to the present invention.

FIG. 21 shows an alternative embodiment of the present invention relating to the update of the usage information. In FIG. 21, first the rank "a" local server 16-1 acknowledges to the master server 14 the update of the usage information and the master server 14 acknowledges to the other rank "a" local server 16-2 the update of the usage information after the master server 14 has finished the update.

Figure 22:
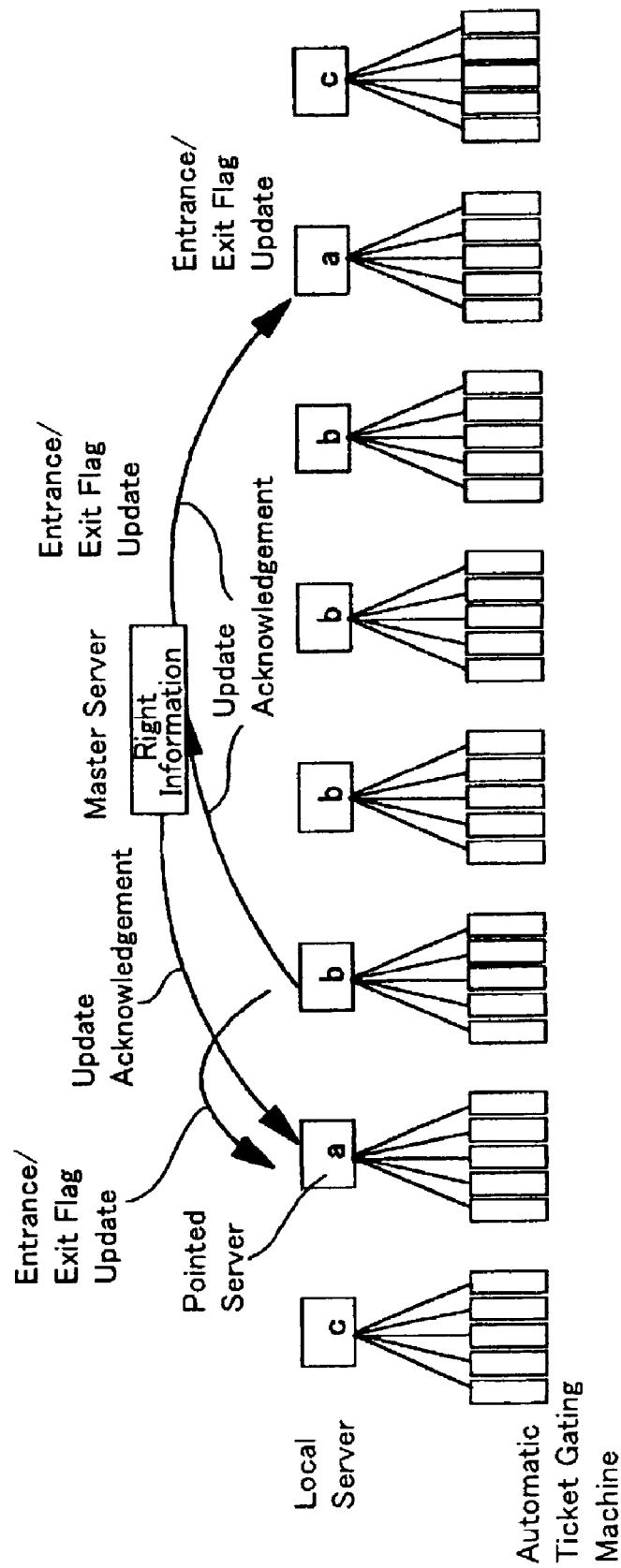
FIG. 22 shows an update of the usage information from the rank "b" local server 16-3.

FIG. 22 shows a block diagram of the usage information from the rank "b" local server. In the other embodiment of the present invention shown in FIG. 22, the rank "b" local server 16-3 issues an inquiry to the rank "a" local server 14 and the same time issues the usage information to the master server 14. The master server 14 acknowledges the update of the usage information to the rank "a" local servers 16-1, 16-2 after the master server 14 has finished the update of the usage information.

Figure 23:
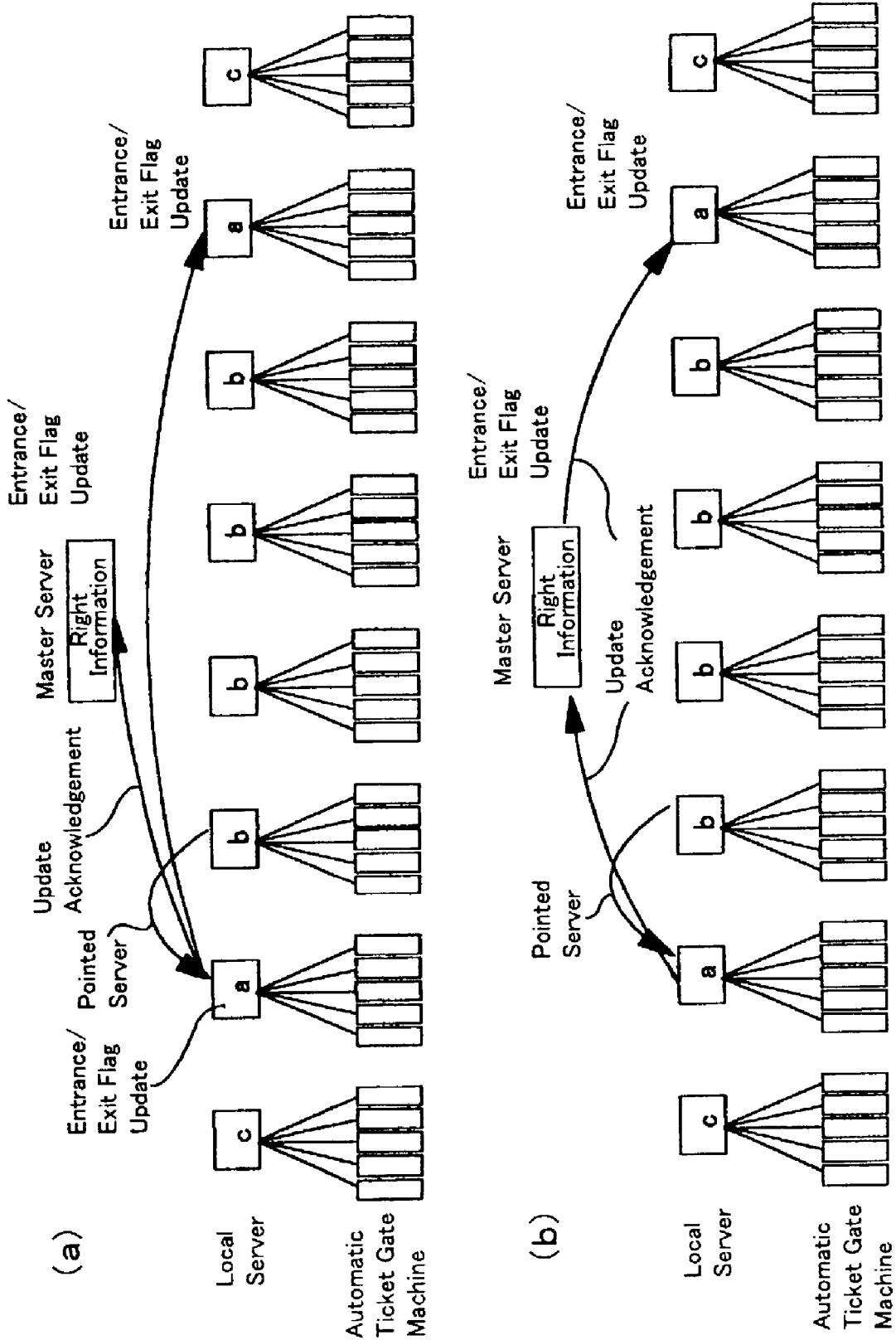
FIG. 23 shows another embodiment of the update of the usage information according to the present invention.

FIG. 23 shows further another embodiment for updating the usage information. In FIG. 23(a), the inquiry is issued from the rank "b" local server to the rank "a" local server and the usage information is updated from the rank "a" local server to the master server and the other rank "a" local server. In the embodiment shown in FIG. 23(b), the inquiry is issued from rank "b" local server to the rank "a" local server and then the rank "a" local server acknowledges the update of the usage information to the master server. The master server next acknowledges the update of the usage information to the other rank "a" local server.

In the present invention, any path may be used to update the master server to the other rank "a" server after issuing the entrance permission signal as shown in FIGS. 21-23. In addition, in the embodiments shown in FIGS. 21-23, the rank "a" local server 16-1 and 16-2 are interchanged their situation each other, for example, up and down of the train. the present invention the pointer transmitted together with the sub-right information may refer to the master server 14.

The present invention will be explained using particular examples, however, the present invention is not limited by the following examples.

EXAMPLE 1

A Ticket Management System for Railway

Figure 24:
FIG. 24 shows a construction of the stations used in an entrance and exit management system in Example 1.

The entrance and exit management system in the railway ticket was used and implemented as Example 1. The entrance and exit management system of Example 1 receives reservations of an express and a local express and manages the entrance and exit in the line comprising 9 stations from S1 to S9 as shown in FIG. 24. The express stops at the stations S1, S6, and S9 and the local express stops at the stations S1, S3, S6, S8, and S9. In Example 1, it was assumed that an user of the express could make halfway entrance and exit at the station where the express made stop and an user of the local express could make halfway entrance and exit at the stations where the local express made stop. One master server was provided and one local server was placed at each station. Electric ticket information relating to reservations for a passenger train was used to manage the entrance and exit.

Receipt of Reservation

In the reception of ticket reservation, information such as kinds of train (values were the express or local express), date, train No., sheet No., boarding station, destination station (get off station) was input, and an effective term information (determined by the kinds of train, date, train No., boarding station, and get off station), the usage information (entrance flag and exit flag: values are unused), and the right information ID are added to the above information to generate the electric ticket information corresponding to the user ID and the electric ticket information was recorded.

Next, based on the right information included in the master server, the information having restriction of contents to be transmitted was generated. The generated electric ticket information was as follows:
The electric ticket information to be transmitted to local servers corresponding to rank "a":
<user ID/effective term/entrance flag and exit flag>
The electric ticket information to be transmitted to local servers corresponding to rank "b":
<user ID/effective term/pointer information>
The electric ticket information to be transmitted to local servers corresponding to rank "c":
<No right information to the local server corresponding to rank "c">

In Example 1, since possibilities for entrance and exit at the boarding station and the get off station included in the reservation related to the right information are expected to be high, local servers of the boarding station and the get off station were set to be rank "a" and local servers at the halfway stations were set to be rank "b" though these station allowed the entrance and exit but the possibilities for the entrance and exit were expected to be low. The above distinctions were automatically allocated to the stations categorized into groups A, B, C using three kinds of information including the kind of train, boarding station, and get off station by calculating in accordance with the logic described below:
Formula 1

All Stations To Stop={S1,S2,S3,S4,S5,S6,S7,S8,S9}

Express Stop Stations={S1,S2,S6,S9}

Local Express Stop Stations={S1,S2,S3,S6,S8,S9}

$A$(Kind of Train,$ij$)={$Si,Sj$}

$B$(Kind of Train,$ij$)={$Sk|Sk$∈Stop Station(Kind of Train),$i<k<j$}

$C$(Kind of Train,$ij$)=All Station To Stop−$A$(Kind of Train,$ij$)−$B$(Kind of Train,$ij$)

For example, when the kind of the train was a local express, and the boarding station was S3, and the destination station was S9, the rank "a", rank "b", and rank "c" stations were determined as follows:
Formula 2

A={S3,S9}

B={S6,S8}

C={S1,S2,S4,S5,S7}

The master server determined to be the local servers corresponding to rank "a" and local servers corresponding to rank "b" according to the above described rules, and distributed the ticket information to each local server and no information to the stations not corresponding to rank "c", thereby allocating the status of each of the stations.

Figure 25:
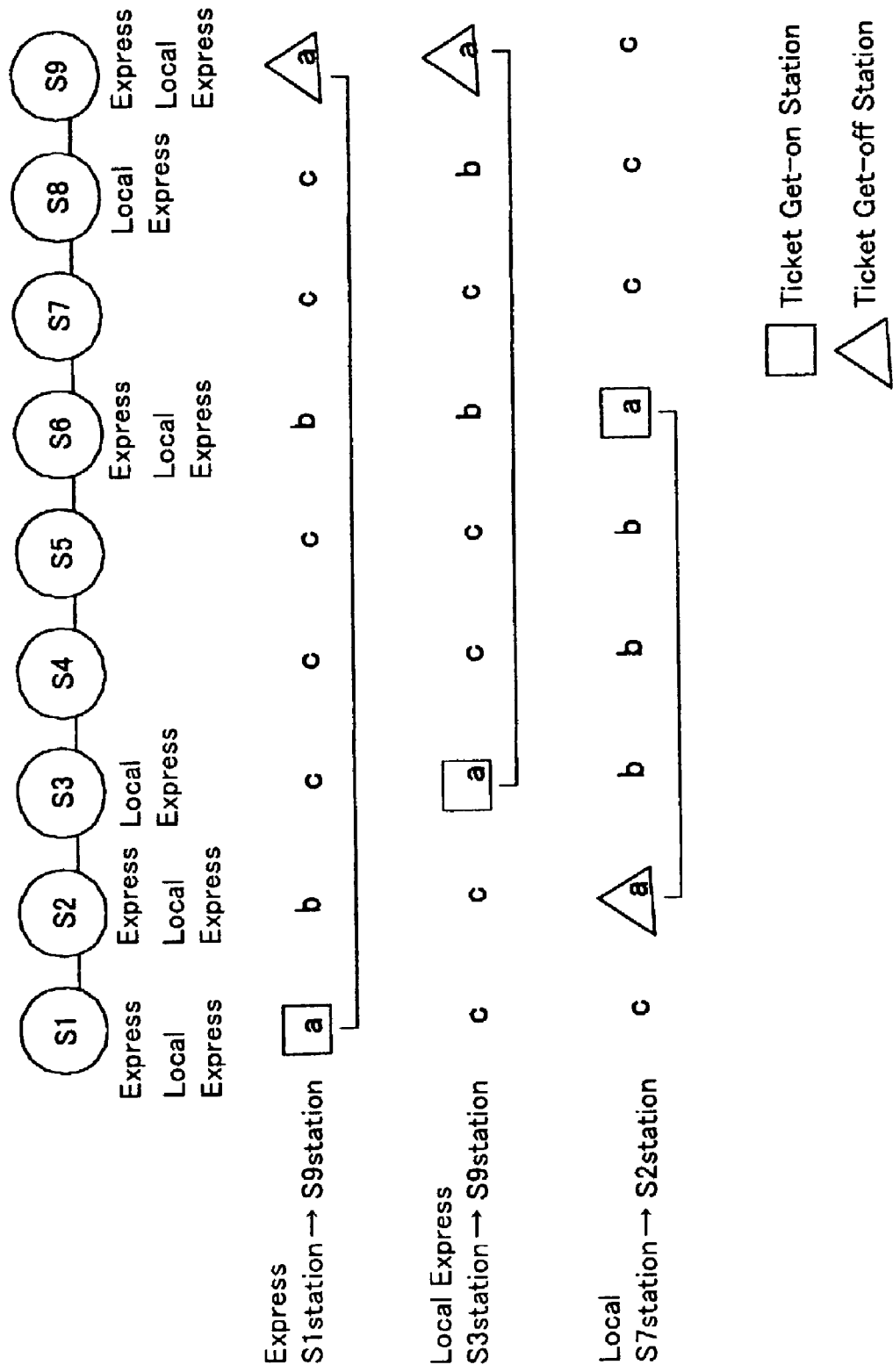
FIG. 25 shows a diagram showing the calculated rank for each station, the boarding station, and the destination station.

FIG. 25 shows the rankings of each station calculated as described above and the boarding station and the get off station. As shown in FIG. 25, the rankings to the same station are different each other in relation to the right information such as kinds of station and the train.

In the table described below, for example, the S3 station becomes any ranking to the other respective stations in the ranking shown in FIG. 24 and FIG. 25. Table 2 shows the ranking of the S3 station to the express train; Table 3 shows the ranking of the S3 station to the local express train; and Table 4 shows the ranking of the S3 station to the local train.

TABLE 2

| | | Express | | | |
|---|---|---|---|---|---|
| | | Ticket Get-off Station | | | |
| | | S1 | S2 | S6 | S9 |
| Ticket Get-on Station | S1 | — | c | c | c |
| | S2 | c | — | c | c |
| | S6 | c | c | — | c |
| | S9 | c | c | c | — |

TABLE 3

| | | Local Express | | | | | |
|---|---|---|---|---|---|---|---|
| | | Ticket Get-off Station | | | | | |
| | | S1 | S2 | S3 | S6 | S8 | S9 |
| Ticket Get-on Station | S1 | — | c | a | b | b | b |
| | S2 | c | — | a | b | b | b |
| | S3 | a | a | — | a | a | a |
| | S6 | b | b | a | — | c | c |
| | S7 | b | b | a | c | c | c |
| | S8 | b | b | a | c | — | c |
| | S9 | b | b | a | c | c | — |

TABLE 4

| | | Local | | | | | | | | |
|---|---|---|---|---|---|---|---|---|---|---|
| | | Ticket Get-off Station | | | | | | | | |
| | | S1 | S2 | S3 | S4 | S5 | S6 | S7 | S8 | S9 |
| Ticket Get-on Station | S1 | — | c | a | b | b | b | b | b | b |
| | S2 | c | — | a | b | b | b | b | b | b |
| | S3 | a | a | — | a | a | a | a | a | a |
| | S4 | b | b | a | — | c | c | c | c | c |
| | S5 | b | b | a | c | — | c | c | c | c |
| | S6 | b | b | a | c | c | — | c | c | c |
| | S7 | b | b | a | c | c | c | — | c | c |
| | S8 | b | b | a | c | c | c | c | — | c |
| | S9 | b | b | a | c | c | c | c | c | — |

In addition, the pointer information sent to each of the local server together with the electric ticket information are shown in Table 5-7. Here in the embodiments shown in Table 5-7, the pointer information is represented by the numerals each provided with the stations; however uniquely allocated to the local server placed at each of the station local server identifiers, for example, may be used when applied to practical cases.

TABLE 5

| | | Express | | | |
|---|---|---|---|---|---|
| | | Ticket Get-off Station | | | |
| | | S1 | S2 | S6 | S9 |
| Ticket Get-on Station | S1 | — | | | |
| | S2 | | — | | |

TABLE 5-continued

| | | Express | | | |
|---|---|---|---|---|---|
| | | Ticket Get-off Station | | | |
| | | S1 | S2 | S6 | S9 |
| | S6 | | | — | |
| | S9 | | | | — |

TABLE 6

| | | Local Express | | | | | |
|---|---|---|---|---|---|---|---|
| | | Ticket Get-off Station | | | | | |
| | | S1 | S2 | S3 | S6 | S8 | S9 |
| Ticket Get-on Station | S1 | — | | | 1 | 1 | 1 |
| | S2 | | — | | 2 | 2 | 2 |
| | S3 | | | — | | | |
| | S6 | 6 | 6 | | — | | |
| | S7 | 7 | 7 | | | | |
| | S8 | 8 | 8 | | | — | |
| | S9 | 9 | 9 | | | | — |

TABLE 7

| | | Local | | | | | | | | |
|---|---|---|---|---|---|---|---|---|---|---|
| | | Ticket Get-off Station | | | | | | | | |
| | | S1 | S2 | S3 | S4 | S5 | S6 | S7 | S8 | S9 |
| Ticket Get-on Station | S1 | — | | | 1 | 1 | 1 | 1 | 1 | 1 |
| | S2 | | — | | 2 | 2 | 2 | 2 | 2 | 2 |
| | S3 | | | — | | | | | | |
| | S4 | 4 | 4 | | — | | | | | |
| | S5 | 5 | 5 | | | — | | | | |
| | S6 | 6 | 6 | | | | — | | | |
| | S7 | 7 | 7 | | | | | — | | |
| | S8 | 8 | 8 | | | | | | — | |
| | S9 | 9 | 9 | | | | | | | — |

In Tables 8-10, the servers to which the update acknowledgments are addressed when the user makes a reservation of the local express and gets on the train at the S3 station and gets off at the S3 station from the other station. In the Tables, m represents the master server and each of the numerals are the numbers of the stations designated by the pointer information and shown in FIG. 24.

TABLE 8

| | | Express | | | |
|---|---|---|---|---|---|
| | | Ticket Get-off Station | | | |
| | | S1 | S2 | S6 | S9 |
| Ticket Get-on Station | S1 | — | | | |
| | S2 | | — | | |
| | S6 | | | — | |
| | S9 | | | | — |

TABLE 9

Local Express

|  |  | Ticket Get-off Station | | | | | |
|---|---|---|---|---|---|---|---|
|  |  | S1 | S2 | S3 | S6 | S8 | S9 |
| Ticket Get-on Station | S1 | — |  | m, 1 |  |  |  |
|  | S2 |  | — | m, 2 |  |  |  |
|  | S3 | m, 1 | m, 2 | — | m, 6 | m, 8 | m, 9 |
|  | S6 |  |  | m, 6 | — |  |  |
|  | S7 |  |  | m, 7 |  |  |  |
|  | S8 |  |  | m, 8 |  | — |  |
|  | S9 |  |  | m, 9 |  |  | — |

TABLE 10

Local

|  |  | Ticket Get-off Station | | | | | | | | |
|---|---|---|---|---|---|---|---|---|---|---|
|  |  | S1 | S2 | S3 | S4 | S5 | S6 | S7 | S8 | S9 |
| Ticket Get-on Station | S1 | — |  | m, 1 |  |  |  |  |  |  |
|  | S2 |  | — | m, 2 |  |  |  |  |  |  |
|  | S3 | m, 1 | m, 2 | — | m, 4 | m, 5 | m, 6 | m, 7 | m, 8 | m, 9 |
|  | S4 |  |  | m, 4 | — |  |  |  |  |  |
|  | S5 |  |  | m, 5 |  | — |  |  |  |  |
|  | S6 |  |  | m, 6 |  |  | — |  |  |  |
|  | S7 |  |  | m, 7 |  |  |  | — |  |  |
|  | S8 |  |  | m, 8 |  |  |  |  | — |  |
|  | S9 |  |  | m, 9 |  |  |  |  |  | — |

Entrance and Exit

The entrance and exit management were assumed that the user entered or exited through an automatic ticket gating machine by reading the user ID from the portable storage means. The automatic ticket gating machine, for managing the entrance and exit, sent the read user ID to the local server placed at each station to inquire whether or not the entrance or exit was permitted and had the gates open depending on the result of the inquiry. Each of the local server determined the permission or refusal for respective entrance and exit according to the procedure of the present invention as shown in FIGS. 13-20.

It was assumed that the master server first updated the entrance and exit flag thereof to indicate entered when received an update message from the local server corresponding to rank "a"; and next, when the local server originated the message was the boarding station, the master server sent the update message to the local server placed at the destination station; the local server received the update message set the entrance and exit flag to indicate entered; in turn when the local server originated the message was the destination station, the update message was sent to the boarding station and the local server received the update message placed at the boarding station set the entrance and exit flag to indicate exited.

Figure 26:
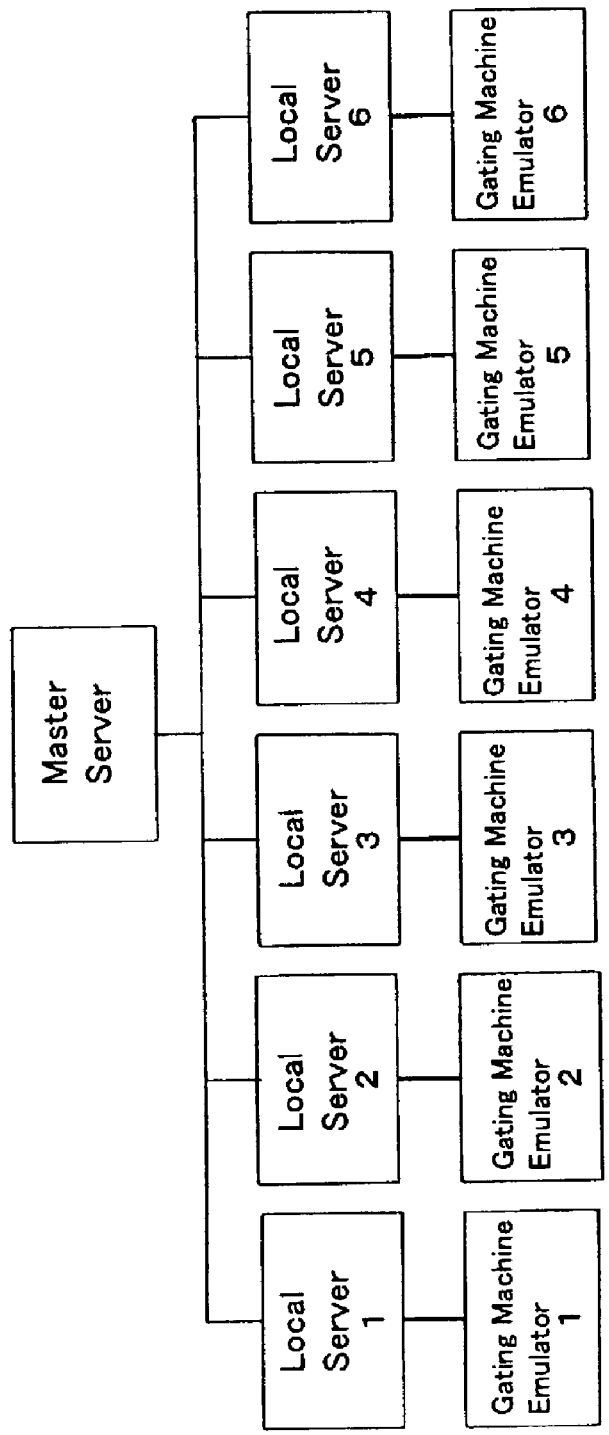
FIG. 26 shows an experimental system for executing the process of the entrance and exit management system according to the present invention.

FIG. 26 shows a system for executing the process of the entrance and exit management system according to the present invention. The system comprised a master server, 6 local servers, and ticket gating emulators for generating entrance and exit events to the local server. A database implemented in the master server was UDB (Trade mark), and a database implemented in the local server was Caribbean (Trade mark). The transmission between the master server and the local server was performed using MQ and the transmission between the local server and the ticket gating machine was performed by socket connections.

In Example 1, 6 local servers were placed at 6 stations where the local express made stops and it was assumed that the express made stops at 4 stations among the 6 stations. 58% of all of the trains was assumed to be express trains. 1% of the users were assumed to get off at halfway stations. In the described condition, frequencies of the reservation were changed so as to examine that the servers might continue the processing without overflows thereof. The reservation frequency was equal to information amounts arriving to the master server per unit time duration and in turn, was equal to the total amounts of entrance and exit events per unit time duration that were generated by the ticket machine emulators.

In the method in which the copies of the right information to all of the local servers, the overhead of the master server became saturation with the reservation processing at the rate of about 3 reservations per second. On the other hand, in the method according to the present invention, the overhead of the master server did not reach to the saturation at above the rate of 10 reservation per second and has found the high performance with sufficient speed and managing capacity.

When the numbers of the local servers is increased, in the method in which the copies are distributed to all of the station, the overheads will be increased, and therefore, the numbers of processed reservations are expected to be lowered. Alternatively, since the method according to the present invention shares the overheads, it is considered that the increase of the local servers does not affect to the overhead of the master server when the reservation numbers themselves are increased unless the numbers of the local servers will be increased.

EXAMPLE 2

Example of Entrance and Exit Gates at a Concert Hall)

Figure 27:
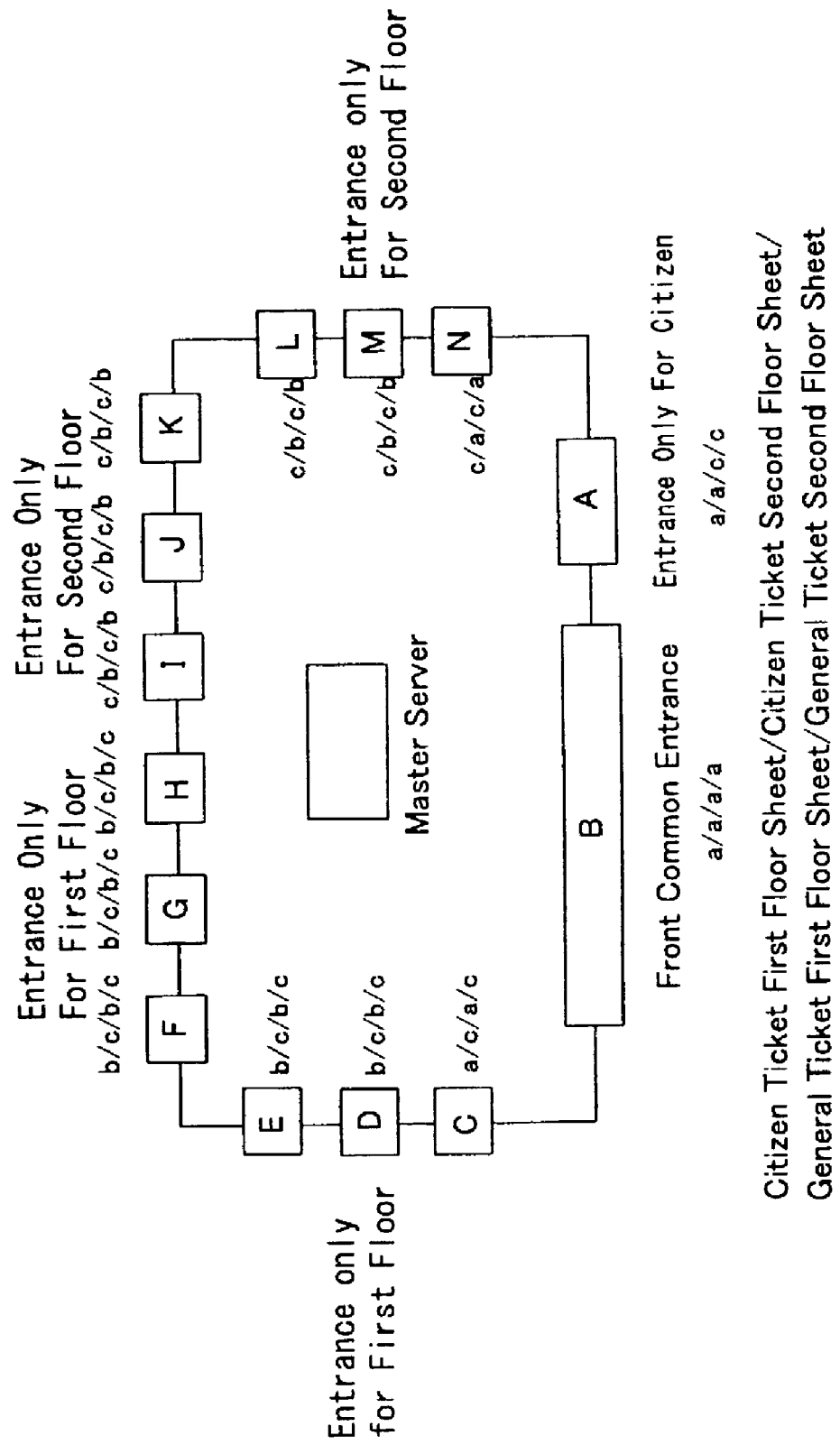
FIG. 27 shows a construction of entrance and exit gates of Example where the present invention.
Figure 28:
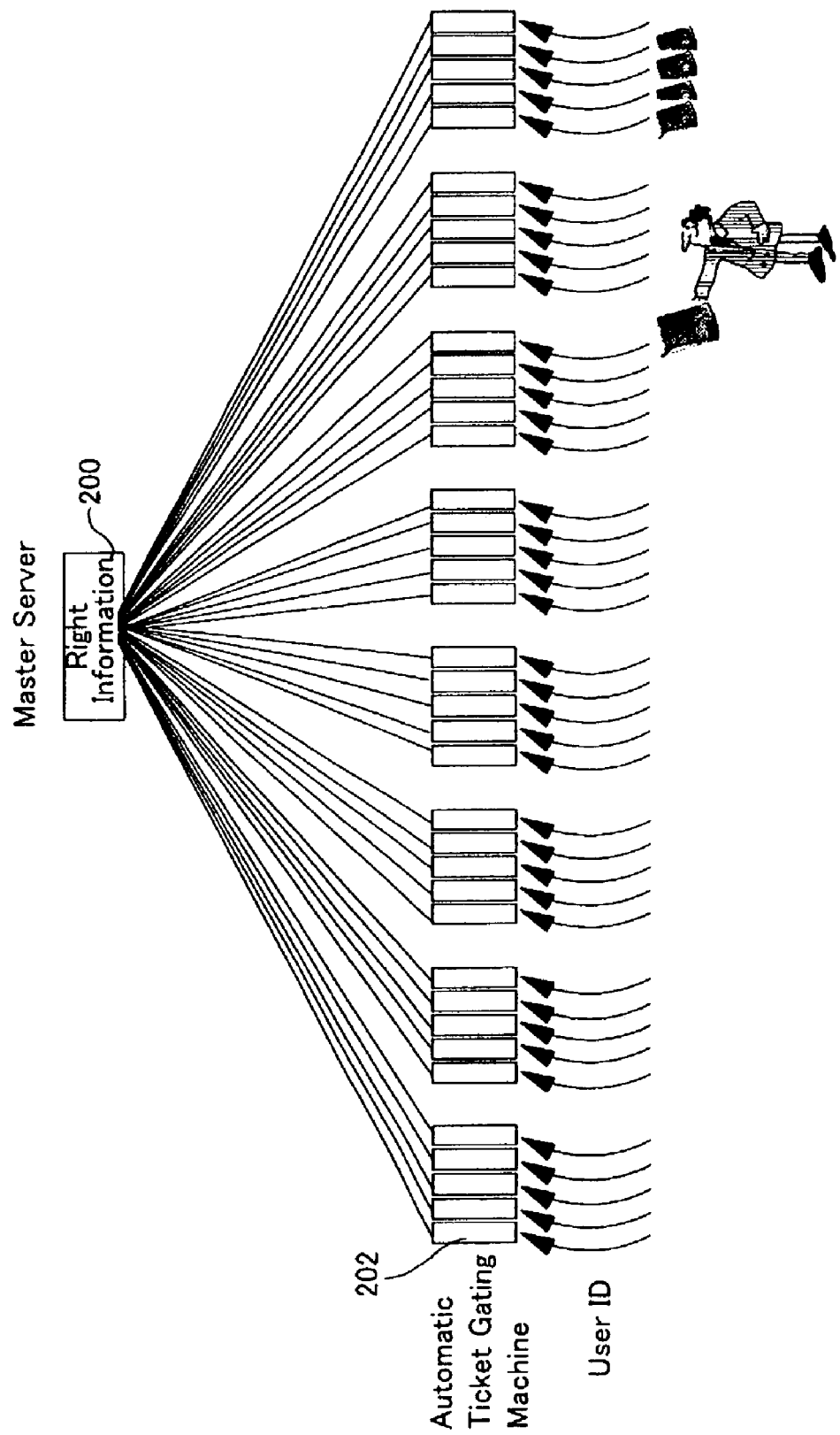
FIG. 28 shows a conventional verification system for verifying user identification information using a master server.
Figure 29:
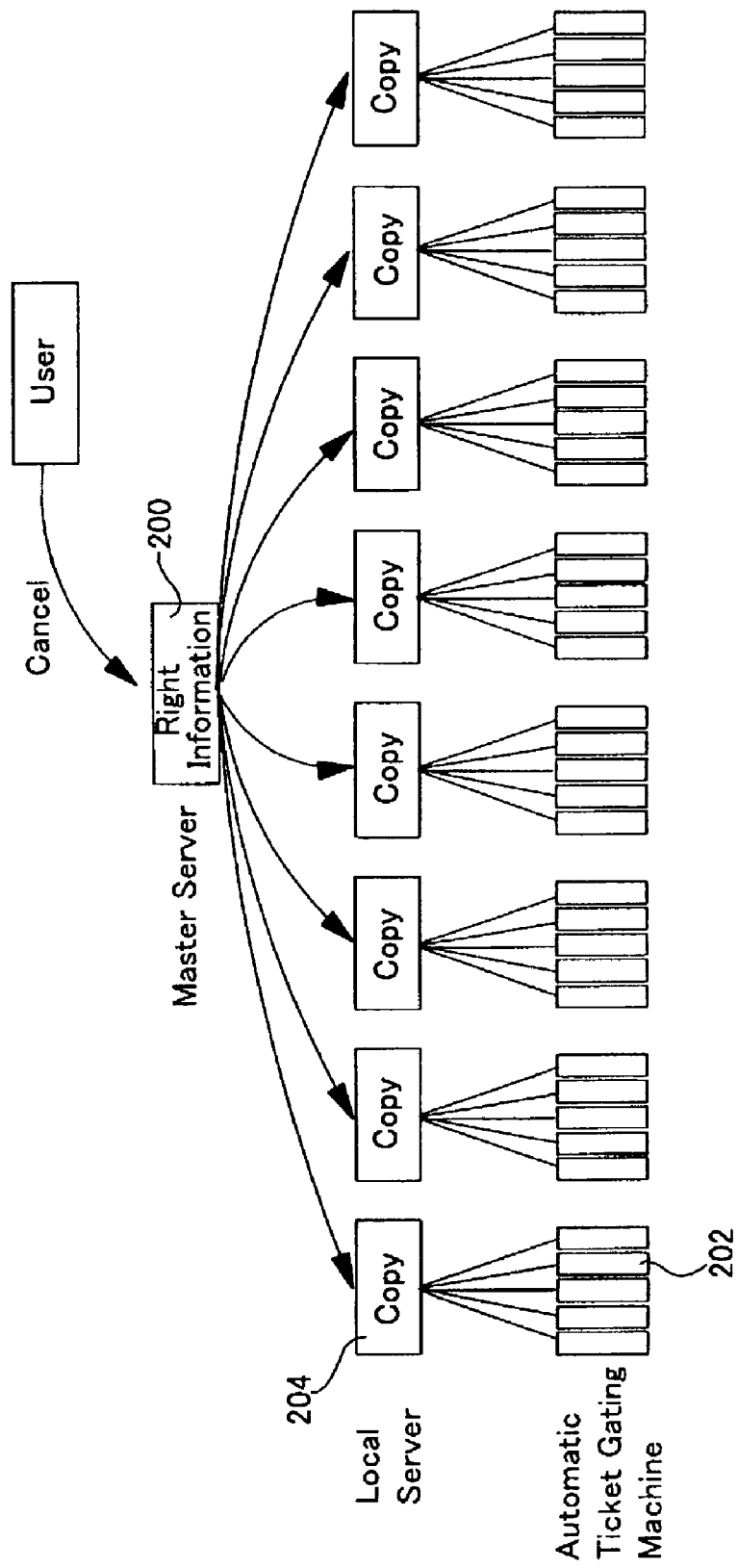
FIG. 29 shows an automatic ticket gate system comprising a master server, local servers, and automatic ticket gating machines connected to the local servers.
Figure 30:
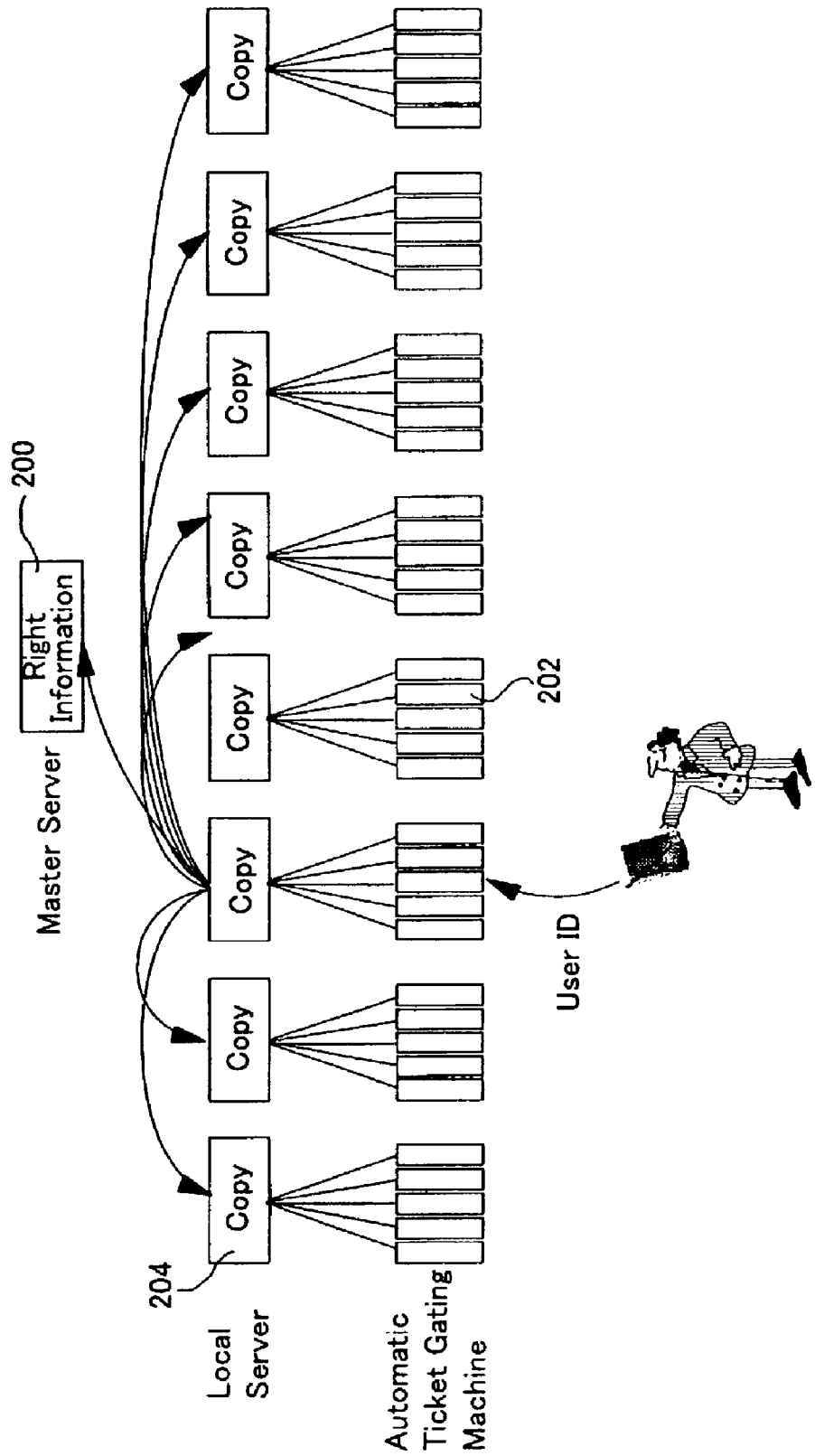
FIG. 30 shows a process of the local server in the automatic ticket gating system shown in FIG. 29.

FIG. 27 shows constructions of entrance and exit gates of Example 2 to which the present invention is applied to the management of the entrance and exit at the concert hall. In Example 2, it is assumed that the entrance and exit management are performed using electric tickets in the concert hall a plurality of entrance and exit gates as shown in FIG. 27.

The concert hall in Example 2 was assumed that a citizen ticket is provided so as to return benefit to local citizens as well as a general admission ticket. In addition, the concert hall was assumed to comprises a first floor and a second floor and therefore, the electric ticket was assumed to be categorized into 4 kinds including "citizen ticket-first floor", "citizen ticket-second floor", "general admission ticket-first floor", and "general admission ticket-second floor".

On the other hand, in order to make entrance and exit smooth, in Example 2, it was assumed that the ticket allowed to enter an D exit is determined for each entrance and exit gate. 14 entrance and exit gates were provided with the alphabetical characters of "A" to "N" and the rule described below were assumed:

(1) a front citizen only entrance and exit gate "A" allowed the citizen ticket to access;
(2) a front entrance and exit gate "B" allowed any kind of ticket to access;
(3) entrance and exit gates "C"-"E" at the left hand in FIG. 27 and the back entrance and exit gates "F"-"H" allowed only first floor tickets to access;
(4) entrance and exit gates "I"-"K" at the right hand in FIG. 27 and the back entrance and exit gates "L"-"N" allowed only second floor tickets to access. One local server for each of the entrance exit gate was placed and a plurality of automatic ticket gating machines was connected to the gates. Thus one master server managed 19 local servers in the entire concert hall.

Reservation of Electric Ticket

When the user makes reservation of the electric ticket, the electric ticket information was generated in the master server so as to include the electric ticket ID, the effective term information (date for usage of the electric ticket), the entrance flag and the exit flag. The local servers were provided with rankings thereto corresponding to "a", "b", and "c" depending on the kinds of the electric tickets in Example 2 according to the Table described below:

TABLE 11

|  | a | b | c |
|---|---|---|---|
| Citizen Ticket First Floor | A, B, C | D, E, F, G, H | I, J, K, L, M, N |
| Citizen Ticket Second Floor | A, B, N | I, J, K, L | C, D, E, F, G, H |
| General Admission Ticket First Floor | B, C | D, E, F, G, H | A, I, J, K, L, M, N |
| General Admission Ticket Second Floor | B, N | I, J, K, L | A, C, E, D, M, N |

Here, in FIG. 27, the rankings "a", "b", and "c" of each of the local servers are shown how the rankings are allocated to the local servers depending on the electric tickets. According to the ranking, the electric ticket information were distributed to the local servers as follows:

(1) to the local servers of rank "a", the electric ticket information, the effective term information, and the entrance flag and the exit flag were distributed.
(2) to the local servers of rank "b", the electric ticket information, the effective term information, and the pointer information which indicated the server for inquiring the entrance flag and the exit flag were distributed. The pointer address servers were assumed to be the local server "C" for the first floor tickets and the local server "N" for the second floor tickets.
(3) to the local servers of rank "c", any reservation information was distributed.

Since the automatic ticket gating machine placed at the front entrance and exit gate is accessed by much users than the others in many cases such that the local server of rank "a" was connected thereto. On the other hand, the automatic ticket gating machines placed at sides and back entrance and exit gates were considered to have less access amounts than the front entrance and exit gate, and hence the local server of rank "b" was connected thereto. However, the entrance and exit gates of both sides, which are closest to the front gate, might be accessed relatively large amounts of users, the rank "a" local server was connected thereto. Here, these rank "a" local servers were selected to the inquired server inquired with respect to the entrance and exit information by the pointer.

Entrance and Exit

In Example 2, the users entered and exited through the automatic ticket gating machine. Similar to Example 1, the automatic ticket gating machine read the user ID from the portable storage means such as IC card, and inquired permission or refusal of the entrance and exit to the local server connected thereto. The automatic ticket gating machine in response to the result causes the gates open and close. The local server determines the permission and refusal for the entrance and exit, and executes the transmissions for update of the electric ticket information depending on necessity thereof. Practical processing methods and hardware constructions were implemented as described in Example 1. It was confirmed that good processing performance and process speed were obtained.

Thus, the present invention allows to reduce trouble for receiving tickets directly by using electric tickets in relation to right information while improving the process efficiency. The present invention also allows to deal promptly with change of the reservation by implementing the electric tickets on the server and further may effectively prevent illegal accesses to use the services using the right information.

The entrance and exit management system may be functioned by implementing the programs for constructing each means described above in the master server and the local server. The above described programs may be written with non-object directed languages or object directed languages such as C language, C++ language, Java (Trade mark), and the above programs may be stored in a computer readable medium such as a flexible disk, a hard disk, optical-magneto disk, a CD-ROM, a CD-RW, and a DVD, or may be distributed through transmission media obtained through the transmission as necessary.

Therefore, the present invention may greatly reduce conventional transmission overheads for the transmission of the data updates when the local servers are used by ranking the local servers into a plurality of ranks and by sending different electric ticket information to each of the local servers to execute the process procedures.

Particularly, according to the present invention, the local servers that are low possibilities to be used are distributed with the pointers other than the electric ticket information so that the updates of the data may be omitted, thereby reducing the transmission overhead upon issuing the update acknowledgments. In addition, the inquiries are issued to the local servers designated by the pointers, and the response to the inquiries are directly used to control the entrance and exit management means so that drawbacks on an average response time may be minimized. That is, according to the present invention, a system, a method therefore, a program for executing the method, and a computer readable medium storing the program therein.

Thus far the present invention has been explained using particular embodiments described in the drawings, however, the present invention is not limited by the above embodiments, for example, the selection of the rank "a" server, rank "b" server, or rank "c" servers may be dynamically determined, depending on characteristics of services, with monitoring overheads to each of the servers.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

We claim:

1. A system for determining whether to allow at least one token to pass through at least one control point, said system comprising:
    a plurality of distributed components, each of the distributed components being associated with a given control point and operative: to store at least a subset of data associated with each token which may be allowed to pass through the control point; and to determine whether to allow a given token, which may be allowed to pass through the control point, to pass through the control point based at least in part on at least a portion of the data stored by the distributed components; and
    a master server operative to determine the subset of data associated with each token to be stored on each of the distributed components associated with a control point through which the token may be allowed to pass;
    wherein, for a given token, at least one member of at least a primary subset of the distributed components associated with at least one control point through which the given token may be allowed to pass stores a different subset of the data associated with that token than at least one member of at least a secondary subset of the distributed components associated with at least one control point through which the given token may be allowed to pass.

2. The system of claim 1, wherein at least one member of at least the secondary subset of the distributed components associated with at least one control point through which a given token may be allowed to pass stores a subset of the data associated with the given token that is stored by at least one member of at least the primary subset of the distributed components associated with at least one control point through which the given token may be allowed to pass.

3. The system of claim 1, wherein at least one member of at least the primary subset of the distributed components associated with at least one control point through which a given token may be allowed to pass stores substantially all of the data associated with the given token.

4. The system of claim 1, wherein at least one member of at least the secondary subset of the distributed components associated with at least one control point through which a given token may be allowed to pass requests data from at least one member of at least the primary subset of the distributed components associated with at least one control point through which the given token may be allowed to pass to determine whether the given token is allowed to pass through at least the given control point associated with the at least one member of at least the secondary subset of the distributed components.

5. The system of claim 1, wherein the master server determines the subset of the data associated with a given token to be stored on a given one of the distributed components associated with at least one control point through which the given token may be allowed to pass based at least in part on a probability that the given token will attempt to pass through the at least one control point associated with the given distributed component.

6. The system of claim 1, wherein a given token is not allowed to pass through a control point associated with at least one of the distributed components which contains no data associated with the given token.

7. The system of claim 1, wherein at least one of the distributed components determines whether to allow a given token which may be allowed to pass through at least one control point to pass through the at least one control point based at least in part on at least a portion of a transmission from the master server.

8. The system of claim 1, wherein the master server is further operative to transmit updated data associated with at least one token to the distributed components associated with a control point through which the token may be allowed to pass based at least in part on input received from at least one of (i) an external data source and (ii) at least one of the distributed components.

9. A method for determining whether to allow at least one token to pass through at least one control point, said method comprising the steps of:
    for each control point through which a given token may be allowed to pass, determining a subset of data associated with each token which may be allowed to pass through the control point to be stored on at least one of a plurality of distributed components associated with at least the control point; and
    determining whether to allow the given token which may be allowed to pass through the control point based at least in part on at least a portion of the data stored by the at least one distributed component associated with the control point;
    wherein, for the given token, members of at least a primary subset of the distributed components associated with at least one control point through the which the given token may be allowed to pass stores a different subset of the data associated with that token than members of at least a secondary subset of the distributed components associated with at least one control point through which the given token may be allowed to pass.

10. The method of claim 9, wherein at least one member of at least the secondary subset of the distributed components associated with at least one control point through which a given token may be allowed to pass stores a subset of the data associated with the given token that is stored by at least one member of at least the primary subset of the distributed components associated with at least one control point through which the given token may be allowed to pass.

11. The method of claim 9, wherein at least one member of at least the primary subset of the distributed components associated with at least one control point through which a given token may be allowed to pass stores substantially all of the data associated with the given token.

12. The method of claim 9, wherein at least one member of at least the secondary subset of the distributed components associated with at least one control point through which a given token may be allowed to pass requests data from at least one member of at least the primary subset of the distributed components associated with at least one control point through which the given token may be allowed to pass to determine whether the given token is allowed to pass through at least the given control point associated with the at least one member of at least the secondary subset.

13. The method of claim 9, wherein the master server determines the subset of the data associated with a given token to be stored on a given one of the distributed components associated with at least one control point through which the given token may be allowed to pass based at least in part on a probability that the given token will attempt to pass through the at least one control point associated with the given distributed component.

14. The method of claim 9, wherein a token is not allowed to pass through a control point associated with at least one of the distributed components which contains no data associated with that token.

15. The method of claim 9, wherein the at least one of the distributed components determines whether to allow a given token which may be allowed to pass through at least one control point to pass through the at least one control point based at least in part on at least a portion of a transmission from the master server.

16. The method of claim 9, wherein the master server is further adapted for transmitting updated data associated with at least a given token to the distributed components associated with a control point through which the given token may be allowed to pass based at least in part on input received from at least one of (i) an external data source and (ii) at least one of the distributed components.

17. An article of manufacture for determining whether to allow at least one token to pass through at least one control point, comprising a non-transitory machine readable storage medium containing one or more programs which when executed implement the steps of:

for each control point through which a given token may be allowed to pass, determining a subset of data associated with each token which may be allowed to pass through the control point to be stored on at least one of a plurality of distributed components associated with at least the control point; and determining whether to allow the given token which may be allowed to pass through the control point based at least in part on at least a portion of the data stored by the at least one distributed component associated with the control point;

wherein, for the given token, members of at least a primary subset of the distributed components associated with at least one control point through the which the given token may be allowed to pass stores a different subset of the data associated with that token than members of at least a secondary subset of the distributed components associated with at least one control point through which the given token may be allowed to pass.

18. The article of claim 17, wherein at least one member of at least the secondary subset of the distributed components associated with at least one control point through which a given token may be allowed to pass stores a subset of the data associated with the given token that is stored by at least one member of at least the primary subset of the distributed components associated with at least one control point through which the given token may be allowed to pass.

19. The article of claim 17, wherein at least one member of at least the primary subset of the distributed components associated with at least one control point through which a given token may be allowed to pass stores substantially all of the data associated with the given token.

20. The article of claim 17, wherein at least one member of the at least the secondary subset of the distributed components associated with at least one control point through which a given token may be allowed to pass requests data from at least one member of at least the primary subset of the distributed components associated with at least one control point through which the given token may be allowed to pass to determine whether the given token is allowed to pass through at least the given control point associated with the at least one member of at least the secondary subset.

21. The article of claim 17, wherein the master server determines the subset of the data associated with a given token to be stored on a given one of the distributed components associated with at least one control point through which the given token may be allowed to pass based at least in part on a probability that the given token will attempt to pass through the at least one control point associated with the given distributed component.

22. The article of claim 17, wherein a given token is not allowed to pass through a control point associated with at least one of the distributed components which contains no data associated with the given token.

23. The article of claim 17, wherein the at least one of the distributed components determines whether to allow a given token which may be allowed to pass through at least one control point to pass through the at least one control point based at least in part on at least a portion of a transmission from the master server.

24. The article of claim 17, wherein the master server is further operative to transmit updated data associated with at least one token to the distributed components associated with a control point through which the token may be allowed to pass based at least in part on input received from at least one of (i) an external data source and (ii) at least one of the distributed components.

* * * * *